(12) United States Patent
Özyigit et al.

(10) Patent No.: US 11,907,890 B2
(45) Date of Patent: Feb. 20, 2024

(54) METHOD AND APPARATUS FOR LABEL-LESS RETURN SHIPMENTS

(71) Applicants: Ali Özyigit, Bonn (DE); Baris Cem Sal, Bonn (DE)

(72) Inventors: Ali Özyigit, Bonn (DE); Baris Cem Sal, Bonn (DE)

(73) Assignee: Deutsche Post AG, Bonn (DE)

( * ) Notice: Subject to any disclaimer, the term of this patent is extended or adjusted under 35 U.S.C. 154(b) by 111 days.

(21) Appl. No.: 17/235,585

(22) Filed: Apr. 20, 2021

(65) Prior Publication Data
US 2021/0326803 A1 Oct. 21, 2021

(30) Foreign Application Priority Data
Apr. 21, 2020 (EP) .................................. 20170517

(51) Int. Cl.
*G06F 17/00* (2019.01)
*G06Q 10/0833* (2023.01)
(Continued)

(52) U.S. Cl.
CPC ....... *G06Q 10/0833* (2013.01); *G06F 16/381* (2019.01); *G06K 7/10861* (2013.01); *G06Q 10/0832* (2013.01); *G06V 30/224* (2022.01)

(58) Field of Classification Search
CPC ............... G06K 9/6256; G06K 7/1413; G06K 7/10722; G06Q 10/10; G06Q 10/087;
(Continued)

(56) References Cited

U.S. PATENT DOCUMENTS

| 2003/0219145 A1 | 11/2003 | Smith |
| 2012/0271850 A1 | 10/2012 | Licata Messana et al. |

(Continued)

FOREIGN PATENT DOCUMENTS

| CN | 101681451 A | 3/2010 |
| CN | 101751476 A | 6/2010 |

(Continued)

OTHER PUBLICATIONS

"Unattended Packages Recognition Based on HMM", Computer Technology and Development, vol. 19, Issue 3, Chunjie Zhang, et al., pp. 28-31, Issue date Mar. 31, 2009.

*Primary Examiner* — Daniel St Cyr
(74) *Attorney, Agent, or Firm* — Reinhart Boerner Van Deuren P.C.

(57) ABSTRACT

Apparatus configured to perform or control obtaining or causing obtaining an image of at least a part of a surface of a consignment unit. The apparatus derives or causes deriving a representation of the at least a part of the surface from the image. The representation includes a set of values representing a corresponding set of height levels. The apparatus generates or causes generation of a string of characters based on representation of the at least a part of the surface. The string of characters includes a first portion representative of the set of height levels of corresponding sections of the at least a part of the surface and a second portion generated based on a function of the representation and/or of the first portion of the string of characters. The apparatus associates or causes associating information representing the string of characters with shipping information of the consignment unit.

24 Claims, 6 Drawing Sheets

(51) Int. Cl.
*G06F 16/38* (2019.01)
*G06K 7/10* (2006.01)
*G06Q 10/0832* (2023.01)
*G06V 30/224* (2022.01)

(58) Field of Classification Search
CPC .... G06Q 50/28; G06Q 20/203; G06F 3/0484; G06F 3/04845
USPC ........................................ 235/375, 380, 385
See application file for complete search history.

(56) References Cited

U.S. PATENT DOCUMENTS

| | | |
|---|---|---|
| 2013/0170758 A1 | 7/2013 | G |
| 2017/0053290 A1 | 2/2017 | Atkinson et al. |
| 2018/0068266 A1* | 3/2018 | Kirmani ............. G06K 7/10861 |
| 2018/0174158 A1 | 6/2018 | Endress et al. |
| 2018/0349846 A1* | 12/2018 | Sever ................. G06Q 30/0641 |
| 2019/0096142 A1* | 3/2019 | Özyigit ................ G06Q 10/083 |
| 2020/0118352 A1 | 4/2020 | Bentley et al. |
| 2021/0157998 A1* | 5/2021 | Rodriguez ........... G07G 1/0054 |

FOREIGN PATENT DOCUMENTS

| | | |
|---|---|---|
| EP | 0913788 A2 | 5/1999 |
| JP | 2015170001 A | 9/2015 |
| KR | 101448543 B1 | 10/2014 |
| WO | 0186419 A2 | 11/2001 |

* cited by examiner

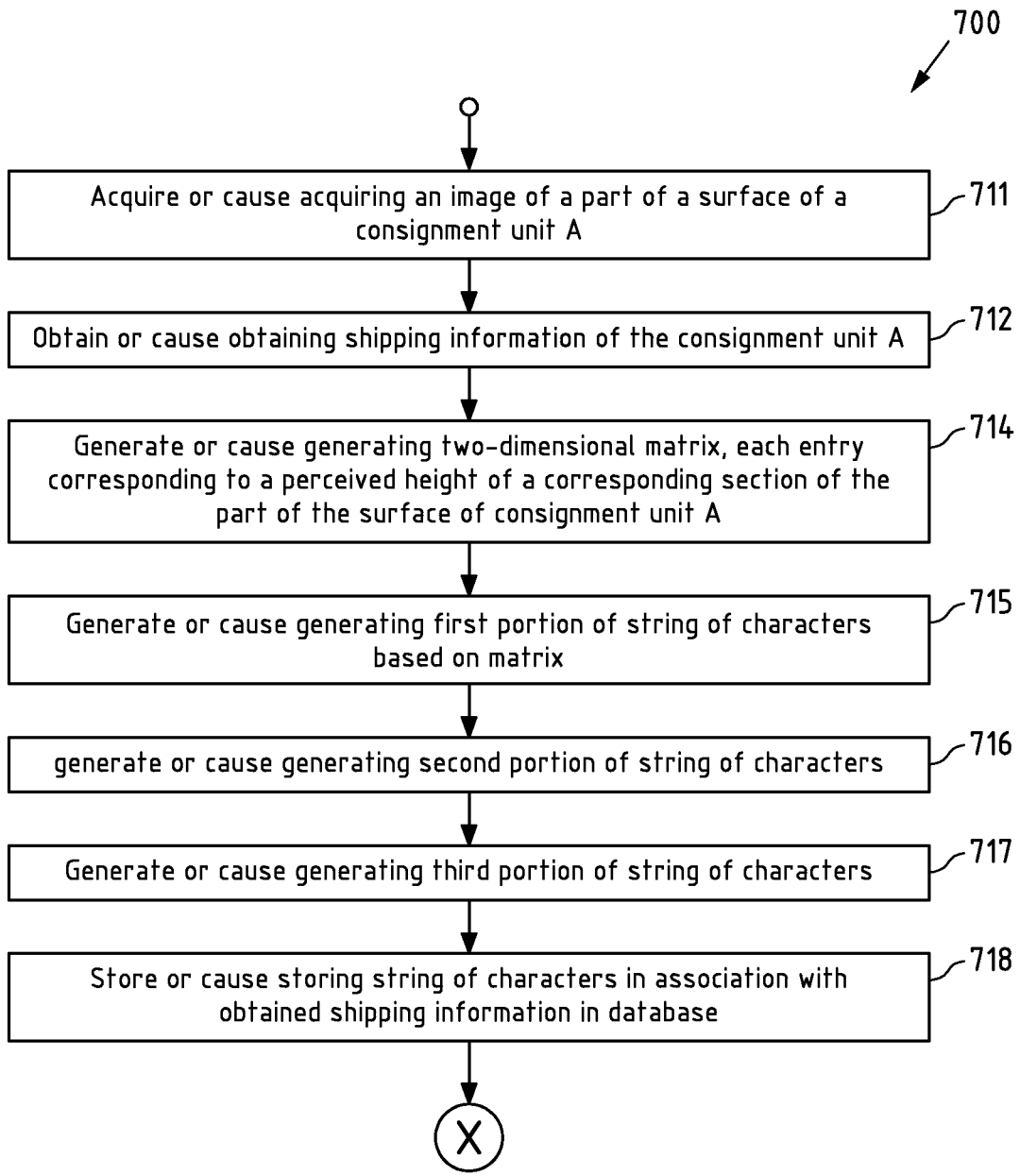

METHOD AND APPARATUS FOR LABEL-LESS RETURN SHIPMENTS

CROSS-REFERENCE TO RELATED PATENT APPLICATIONS

This patent application claims priority to European Patent Application No. 20170517.5, filed Apr. 21, 2020, the entire teachings and disclosures of which are incorporated herein by reference thereto.

FIELD OF THE DISCLOSURE

The present disclosure relates in general to the field of logistics and/or postal services, in particular to methods, apparatuses, systems and computer programs enabling label-less return shipments.

BACKGROUND

An ecommerce customer may intend to return a consignment unit including one or more products previously acquired from a merchant, e.g. from an online shop. To enable a corresponding return shipment, such customer is usually required to print a label to be applied to the consignment unit before returning the consignment unit e.g. to a post office. Such label usually indicates shipping information such as name and address of the sender (the customer) and name and address of the recipient (the online shop), a type of delivery service, and potentially further pieces of information facilitating the shipping process.

In order to provide the label for the return shipment, the customer is often required to communicate with the merchant to obtain necessary shipping information, e.g. is required to visit a website provided by the merchant and to follow instructions provided by the merchant. Further, the customer is required to print a return label which in turn requires the customer to have access to and to use a printer. Even if modern merchants offer services that may allow customers downloading shipping information e.g. to a mobile device enabling print-out of a return label at a post office, the customer still needs to communicate with the merchant and still is required to carry items such as the mobile device to the post office, which is not always desirable. In other words, the customer is usually faced with a plurality of inconveniences when intending to return a consignment unit to a merchant.

SUMMARY OF SOME EXAMPLE EMBODIMENTS OF THE INVENTION

It is inter alia an object of the invention to provide in particular methods, apparatuses, systems and computer programs for improving in particular label-less return processes, in particular which allow a customer to return a consignment unit without being required to print a corresponding return label.

According to a first exemplary aspect of the invention, a method performed by at least one first apparatus is disclosed, the method comprising obtaining or causing obtaining an image of at least a part of a surface of a consignment unit; deriving or causing deriving a representation of the at least a part of the surface from the image, the representation comprising a set of values respectively representing a corresponding set of height levels of corresponding sections of the at least a part of the surface; generating or causing generating a string of characters based on the representation of the at least a part of the surface, the string of characters comprising at least a first portion representative of the set of height levels of the corresponding sections of the at least a part of the surface and a second portion generated based on a function of the representation and/or of the first portion of the string of characters; and associating or causing associating information representing the string of characters with shipping information of the consignment unit.

The method according to the first aspect of the invention may for instance be performed by an apparatus or by a system that comprises a plurality of apparatuses. The apparatus or system may for instance form a part of a device for registering a consignment unit with corresponding shipping information of the consignment unit. The apparatus or system may for example correspond to or be incorporated in a mobile device used by a customer when intending to return a consignment unit.

According to a second exemplary aspect of the invention, a method performed by at least one second apparatus is disclosed, the method comprising obtaining or causing obtaining first information representing a first string of characters with a first portion representative of a set of height levels of corresponding sections of at least a part of a surface of a first consignment unit; determining or causing determining, based on the obtained first information, whether or not the first string of characters is present in a database; and if the first string of characters is present in the database, the method further comprises at least one of (a) or (b):

(a) outputting or causing outputting shipping information associated with information representing the first string of characters in the database;
(b) outputting or causing outputting a control signal based on the shipping information for causing an external apparatus to perform a predetermined operation.

The method according to the second aspect of the invention may for instance be performed by an apparatus or by a system that comprises a plurality of apparatuses. The apparatus or system may for instance correspond to or be comprised by a mobile device such as a handheld computing device and/or a smartphone, and/or by a dedicated device for retrieving shipping information based on a string of characters generated based on an obtained image of the consignment unit, and/or by a network server and/or a network server cloud.

For all aspects of the invention presented above (referred to as the "respective aspect" below), the following is disclosed:

A computer program according to the respective aspect of the invention, the computer program when executed by a processor causing an apparatus or system to perform or control the method according to the respective aspect of the invention.

A computer readable storage medium according to the respective aspect of the invention, in which the computer program according to the respective aspect of the invention is stored. The computer readable storage medium could for example be a disk or a memory or the like. It may for instance be tangible and/or non-transitory. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM)) or hard disk of a computer, or be intended for distribution of the program, like an optical disc.

An apparatus according to the respective aspect of the invention, which is configured to perform or comprises respective means for performing or controlling the method according to the respective aspect of the invention. The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means.

An apparatus according to the respective aspect of the invention, comprising at least one processor and at least one memory including computer program code, the at least one memory and the computer program code configured to, with the at least one processor, cause an apparatus (e.g. the apparatus according to the respective aspect of the invention) at least to perform or control the method according to the respective aspect of the invention.

A system according to the respective aspect of the invention, the system comprising a plurality of apparatuses and configured to perform or comprises respective means for performing or controlling the method according to the respective aspect of the invention.

The disclosed apparatus according to any aspect of the invention may be a module or a component for a device, for example a chip and/or processor. Alternatively, the disclosed apparatus according to any aspect of the invention may be a device, for instance a server or other electronic device. The disclosed apparatus according to any aspect of the invention may comprise only the disclosed components (e.g. means) or may further comprise one or more additional components.

Furthermore, according to a third aspect of the invention, a system is disclosed, the system comprising an apparatus or system according to the first aspect of the invention and an apparatus or system according to the second aspect of the invention.

In other words, a system is disclosed that may comprise:
at least one first apparatus configured for:
  obtaining or causing obtaining an image of at least a part of a surface of a first consignment unit;
  deriving or causing deriving a representation of the at least a part of the surface from the image, the representation comprising a set of values respectively representing a corresponding set of height levels of corresponding sections of the at least a part of the surface;
  generating or causing generating a first string of characters based on the representation of the at least a part of the surface, the first string of characters comprising at least a first portion representative of the set of height levels of the corresponding sections of the at least a part of the surface and a second portion generated based on a function of the representation and/or of the first portion of the first string of characters; and
  associating or causing associating first information representing the first string of characters with shipping information of the first consignment unit; and at least one second apparatus configured for:
  obtaining or causing obtaining the first information representing the first string of characters with the first portion representative of the set of height levels of corresponding sections of the at least a part of the surface of the first consignment unit;
  determining or causing determining, based on the obtained first information, whether or not the first string of characters is present in a database; and
  if the first string of characters is present in the database, the method further comprises at least one of (a) or (b):
    outputting or causing outputting the shipping information associated with the first information representing the first string of characters in the database;
    outputting or causing outputting a control signal based on the shipping information for causing an external apparatus to perform a predetermined operation.

One or more of the features and/or embodiments disclosed in the following may further define the first and/or second aspect of the invention.

In accordance with aspects of the present invention, information derived from an image of a part of a surface of a consignment unit that represents a surface structure, in particular a microstructure, is employed for uniquely identifying the consignment unit. Thereby, in an exemplary embodiment, a consignment unit corresponds to or comprises a letter, a parcel and/or a transport box. Further, the part of the surface of the consignment unit of which the image is obtained may comprise a bare surface portion of the consignment unit and/or at least a part of a label of the consignment unit, e.g. a label used for initially sending the consignment unit. Being employed for uniquely identifying the consignment unit, the derived information may thus be employed as a replacement for a label in particular as replacement for a return label. To this end, the information derived from the image is associated with shipping information of the consignment unit at a registering stage employing the method according to the first aspect. The registering stage may for example correspond to a situation, where a customer initiates a return delivery.

For example, a customer may use a mobile device such as a smartphone (an example of the at least one first apparatus) for obtaining an image of at least a part of a surface of a consignment unit (an example of the consignment unit addressed by the method according to the first aspect), e.g. a parcel including goods the customer has beforehand bought at an online shop, and which the customer intends to return to the online shop. It is noted that in an exemplary embodiment, the surface corresponds to or comprises a bare surface portion of the consignment unit and/or at least a part of a label of the consignment unit, e.g. at least part of the label used for shipping the consignment unit to the customer that may still be attached to the consignment unit. While referring to a smartphone as an example of a mobile device, it is noted that in an exemplary embodiment, the at least one first apparatus and/or the at least one second apparatus comprises or corresponds to a mobile device, e.g. a handheld computing device, a smartphone, a tablet computer, a notebook computer, a smart watch, and a smart band and/or an Internet-of-Things (IoT) device.

Having obtained the image, the shipping information may be obtained. In an exemplary embodiment, the method according to the first aspect thus further comprises obtaining or causing obtaining the shipping information of the consignment unit based on user input and/or from the consignment unit. For example, the customer may perform user input by manually inputting (e.g. using a corresponding interface provided by the smartphone) address information of the online shop to which the consignment unit is to be returned. Alternatively or in addition, a dedicated application (a software program) for example provided by a postal service provider, may be installed on the customer's smartphone which may already have stored corresponding shipping information, e.g. in a list of consignment units delivered to the customer. In such case, the customer may perform user input by inputting shipping information by selecting the consignment unit to be returned from such list. It is noted that such application may in addition be used for controlling a camera of the smartphone and thus for obtaining the image of the at least part of the surface.

Further, for obtaining the shipping information of the consignment unit from the consignment unit, in an exemplary embodiment, the customer's smartphone (e.g. the at least one first apparatus) is configured to recognize (e.g. employing a camera and/or scanner comprised by or connected to the at least one first apparatus) text present on a surface of the consignment unit, e.g. on a shipping label initially used for shipping the consignment unit to the customer. The text may be recognized e.g. by employing optical character recognition (OCR). Alternatively or in addition, in an exemplary embodiment, the at least one first apparatus is configured to obtain the shipping information from a one or two dimensional bar code (e.g. a QR-code) present on a surface of the consignment unit e.g. present on said shipping label initially used for shipping the consignment unit to the customer. Thus, in an exemplary embodiment, the method according to the first aspect comprises obtaining or causing obtaining at least part of the shipping information of the consignment unit based on text and/or a one/two-dimensional bar code present on a surface (e.g. at least part of a label) of the consignment unit.

It is further noted that while the structure of a surface of a consignment unit advantageously allows uniquely identifying the consignment unit and thus enables in particular label-less logistics processes such as return shipment processes, such label that may still be present on a surface of such consignment unit, e.g. a label used for an initial sending process of the consignment unit to a customer, may in an exemplary embodiment be used to advantageously complement and/or support such processes. While as described before, in an exemplary embodiment, the label may be used for obtaining at least part of shipment information to be associated with the information representing the string of characters to be derived by the at least one second apparatus e.g. from a database based on the string of characters, such shipping information may in addition be directly obtained from such label.

In other words, in an exemplary embodiment, for obtaining (further) shipping information of the consignment unit, the at least one second apparatus is configured to recognize (e.g. employing a camera and/or scanner comprised by or connected to the at least one second apparatus) text present on a surface of the consignment unit, e.g. on a shipping label initially used for shipping the consignment unit to the customer. The text may be recognized e.g. by employing optical character recognition (OCR). Alternatively or in addition, in an exemplary embodiment, the at least one second apparatus is configured to obtain the shipping information from a one or two dimensional bar code (e.g. a QR-code) present on a surface of the consignment unit e.g. present on said shipping label initially used for shipping the consignment unit to the customer.

Thus, in addition to acquiring shipping information e.g. from a database where the shipping information may be stored in association with the first string of characters, the at least one second apparatus may in an exemplary embodiment be configured for obtaining (at least part of or further) shipping information directly from the consignment unit, e.g. from a label and/or from a bar code present on a surface of the consignment unit. In this way, information from a same label or bar code used for initial shipment of a consignment unit to a customer may be used for supporting the return process and may thus enhance reliability of the process. In an exemplary embodiment, the method according to the second aspect thus comprises obtaining or causing obtaining at least part of the shipping information of the consignment unit based on text and/or a one/two-dimensional bar code present on a surface (e.g. at least part of a label) of the consignment unit.

Based on the obtained image, a representation of the at least a part of the surface and based thereon, a string of characters is generated. For example, the application installed at the customer's smartphone may then associate the information representing the string of characters with the shipping information of the consignment unit obtained as disclosed above.

To this end, in an exemplary embodiment, the information representing the string of characters is stored in association with the shipping information of the consignment unit in a storage comprised by the mobile device and/or is provided to be accessible by a network server (an example of the at least one external network device). For example, the smart phone may transmit the information representing the string of characters in association with the shipping information to the network server via a suitable network connection (an example of a communication path as disclosed further herein).

The customer may then return the consignment unit to a post office where a staff member of the post office uses a mobile device and/or a dedicated device (an example of the at least one second apparatus) that may be installed at the post office for obtaining the first information representing the first string of characters with a first portion representative of a set of height levels of corresponding sections of at least a part of a surface of the consignment unit provided by the customer (an example of the first consignment unit addressed by the method according to the second aspect).

To this end, in an exemplary embodiment, the staff member may use his or her smartphone or the dedicated device for obtaining an image of at least a part of a surface of the first consignment unit, an application installed on the smartphone or the dedicated device may derive a representation of the at least a part of the surface from the image and may generate the first string of characters based on the representation of the at least a part of the surface. It is noted that alternatively or in addition, in an exemplary embodiment a network device, e.g. a device comprised by, connected to, or corresponding to a network server takes the role of the at least one second apparatus and may in such case receive the first information via a network connection.

Having obtained the first information, the at least one second apparatus (e.g. using the application installed on the smartphone of the staff member or on the dedicated device) determines whether or not the first string of characters is present in a database, e.g. in a database connected to or comprised by the network device to which the mobile device of the customer has transmitted the information representing the string of characters in association with the shipping information of the customer's consignment unit. To this end, the device used by the staff member (the mobile device or the dedicated device) may communicate with the network device using a suitable network connection (e.g. the communication path disclosed further herein).

In the affirmative case, the device used by the staff member (the at least one second apparatus) outputs shipping information of the first consignment unit that is associated with the information representing the string of characters in the database. For example, the shipping information may be displayed on a display of the staff member's smartphone to be used by the staff member for generating a return label. Alternatively, or in addition, if said dedicated device is used, the dedicated device may output the shipping information by printing a corresponding return label to be attached to the customer's consignment unit by the staff member. Yet alternatively, the at least one second apparatus may output a control signal based on the shipping information, e.g. to cause a printer (an example of the external apparatus) e.g. installed at the post office and connected to the dedicated device or to the staff member's smartphone to print a corresponding return label (an example of the predetermined operation). Thus, while such control signal may in an exemplary case be used for controlling a label printing process e.g. for printing a return label, it is noted that such control signal may trigger different transport and/or logistics operations as the information representing the string of characters enables for example scanners and/or cameras employed for example in logistics facilities such as sorting centers to securely identify consignment units without a requirement of return labels and/or without any requirement of labels or other markings at all.

Thus, in addition or alternatively, the at least one second apparatus may correspond to or be comprised by a dedicated logistics device installed at a suitable stage of a logistics process, e.g. may correspond to or may be (wirelessly or via a wired connection) connected to a control apparatus of a conveyor belt of a different transport apparatus installed at a corresponding logistics facility. Such dedicated logistics device is in an exemplary embodiment provided with a camera and/or scanner for obtaining the first information and/or is configured for obtaining the first information via a network connection and is in an exemplary embodiment, after performing the preceding steps of the method according to the second aspect, configured for outputting a control signal based on the shipping information for causing the conveyor belt or the different transport apparatus (examples of the external apparatus) to perform a predetermined operation, e.g. to perform operations to transport the consignment unit in accordance with the shipping information.

Thus, by using the information derived from the image of a part of a surface of a consignment unit that represents a surface structure, in particular a microstructure, for uniquely identifying the consignment unit, a customer is no longer required to print a return label at home. By associating the information representing the string of characters with the shipping information of the consignment unit e.g. already at a customer's home, the customer is in addition not required to take any further items (e.g. a smartphone) to the postal office but only needs to return the bare consignment unit to be returned to the postal office. Yet in addition, no further communication between the customer and e.g. the online shop is required, e.g. to obtain any shipping information needed for return of the consignment unit. Thus, employing the respective methods in accordance with aspects of the invention enables facilitating in particular return delivery processes both for customers and for corresponding shops.

These advantages are in particular based on the finding that a structure of a surface of a consignment unit is unique to the consignment unit in a corresponding manner as a fingerprint of a human person is unique to the person. In particular, in an exemplary embodiment, the height levels of the sections are representative of a microstructure of the surface of the consignment unit. Such structure of the surface of the consignment unit, e.g. the microstructure, is a unique feature of the particular surface and can therefore be advantageously employed for uniquely identifying the consignment unit. For example, in case in which a consignment unit corresponds to or comprises a parcel including one or more goods shipped to the customer, while a surface of the parcel may appear equal to a corresponding surface of a further parcel macroscopically, these surfaces are different on a microscopic level. Thus, in analogy to a human fingerprint such microstructure of a surface of such parcel may thus be used for uniquely identifying the parcel.

It is noted that while it may be possible to use an image of the surface structure for identifying such surface, employing a method according to the first aspect, a string of characters (a code) is generated based on the image that uniquely represents the surface and thus the consignment unit. Use of the string of characters instead of the image provides a considerable advantage in that a considerably larger number of consignment units can be processed in a given time. In addition, storage space employed for storing the information representing respective strings of characters with corresponding shipping information of corresponding consignment units is considerably reduced as compared to a case in which e.g. the image is used instead of the string of characters. At the same time, by uniquely reflecting the surface structure of the consignment unit, use of the string of characters provides a highly secure means for reliably identifying a consignment unit.

In order to enable shipping processes such as return shipping processes, the shipping information corresponds to or comprises information suitable for identifying an addressee and/or a location of the addressee of the consignment unit. Such information may include any information that may link the addressee with the consignment unit. Thus, in an exemplary embodiment, the shipping information corresponds to or comprises sender information, e.g. name and/or address of the initial recipient, e.g. the customer name and/or address, recipient information, e.g. name and/or address of the initial sender of the consignment unit that has send the consignment unit to the customer, e.g. name and/or address of the online shop, shipping carrier information, e.g. information used by the carrier that has initially delivered the consignment unit from the shop to the customer and used by the carrier for identifying the consignment unit and/or its source and/or its destination, logistics company information, and/or delivery-related information, e.g. priority information, e.g. indicating whether the consignment unit shall be delivered with higher or lower priority and/or information relating to size and weight of the consignment unit.

It is noted that in an exemplary embodiment, the shipping information further comprises position information of the at least one first apparatus, in particular of the first apparatus when (e.g. at a point in time when) obtaining the image of the at least part of the surface. Further, in an exemplary embodiment, the method according to the first aspect comprises a step of obtaining or causing obtaining position information representative of a position of the at least one first apparatus when obtaining the image of the at least part of the surface. For example, to this end, the at least one first apparatus may comprise or may be connected to a GNSS signal receiver and may be configured to determine or to obtain position information of the at least one first apparatus based on one or more GNSS signals received via said GNSS signal receiver, in particular while obtaining the image of the at least part of the surface. Thereby, in an exemplary embodiment, the position information is position information defined based on a GNSS (Global Navigation Satellite System), in particular GPS information. In other words, in this embodiment, the shipping information comprises for example information indicative of GPS coordinates of the first apparatus. Such position information may for example advantageously allow performing an optional plausibility check where in case of a return shipment it is checked if a customer has in fact received a delivery (the consignment unit) in the first place.

Thus, in an exemplary embodiment, the method according to the second aspect comprises a step of outputting or causing outputting verification information and/or a control signal based on position information comprised by shipping information associated with the first information representing the first string of characters. Thereby, the verification information may correspond to information displayed via a display of and/or connected to the second apparatus and may be configured for informing a user of the second apparatus whether or not it is likely that a shipment has been in fact received by a sender of a return shipment. For example if a distance between the sender (e.g. a receiver of an initial shipment) is between a predefined threshold (e.g. a typical distance to a next post office), the verification information may correspond to information verifying that the consignment unit has in fact been received by the sender of the return shipment in the first place. Likewise, the control signal may be configured for triggering a suitable verification operation such as allowing and/or stopping transport of a consignment unit.

In an exemplary embodiment, the method according to the first aspect comprises obtaining or causing obtaining image information representative of a marking and/or a pattern present on at least part of a surface of the consignment unit and associating or causing associating the image information representative of a marking and/or a pattern with the shipping information of the consignment unit. Such marking or pattern includes in an exemplary embodiment one or more of a handmade image, a handwritten marking or signature, a texture, or one or more handwritten letters or words.

Thus, in such case, the method according to the second aspect comprises in an exemplary embodiment-obtaining or causing obtaining image information representative of a marking and/or a pattern present on at least part of a surface of the consignment unit;
  determining or causing determining, based on the obtained image information, whether or not the first string of characters is present in a database; and
  if the first string of characters is present in the database, the method further comprises at least one of (a) or (b):
  outputting or causing outputting shipping information associated with the first information representing the first string of characters in the database;
  outputting or causing outputting a control signal based on the shipping information for causing an external apparatus to perform a predetermined operation.

Thus, such markings and/or images and/or pictures present on a surface of the consignment unit may advantageously be employed for supporting the method according to the second aspect. For example, in an exemplary embodiment, if the first string of characters is not determined to be present in the database, the said steps based on the image information may be performed to in such case still find the shipping information and thus enable e.g. a label-less shipping operation.

As mentioned, aspects of the present disclosure in particular take advantage of the capability of a surface structure of a consignment unit to be used for uniquely identifying a consignment unit. To this end, a (e.g. mathematical) representation of the at least a part of the surface is derived from the image obtained from the at least a part of the surface, the representation comprising a set of values respectively representing a corresponding set of height levels of corresponding sections of the at least a part of the surface. In an exemplary embodiment, deriving the representation may correspond to or comprise converting or causing converting the image into a two-dimensional matrix, where each dimension of the matrix corresponds to a spatial dimension of the image (and/or consignment unit) and wherein each entry of the matrix represents a height of a corresponding section of the image. In such case, generating a string of characters based on the representation of the at least a part of the surface, the string of characters comprising at least a first portion representative of the set of height levels of the corresponding sections of the at least a part of the surface may in an exemplary embodiment be understood as appending entries of the matrix one after the other to generate the first portion of the string of characters.

In the following, a simplified example is explained disclosing a simplified way, according to which a representation of the at least a part of the surface (in this example a matrix representing perceived heights of the at least a part of the surface) is used for generating a string of characters. For example, an image may be converted into a square matrix of dimension n, i.e. an n×n matrix (the concept being similarly applicable to a non-square matrix). Thereby, each entry of the matrix represents a perceived height of a portion of the image corresponding to the entry, whereby each dimension of the matrix represents a corresponding dimension of the image (e.g. n×n may correspond to height×width of the image). In an exemplary embodiment, entries of the matrix are normalized, e.g. an entry representing a largest perceived height within the image is set to a value equal to 1 and an entry representing a smallest perceived height within the image is set to a value equal to 0. This advantageously helps to reduce or even eliminate an effect different lighting conditions may have on the heights perceived by a camera taking the image of the at least part of the surface.

The normalized height values included in the matrix are rounded (e.g. to two digits after a comma) and then represented in binary form. Thereby, different representations may be achieved by multiplying each value by a predefined rounding factor (e.g. by 1, 2, . . . 2k) in accordance with the amount of rounding before converting the values into binary form. This parameter is suitable to adjust e.g. a length of resulting strings of characters and a degree of differentiation of different strings of characters.

The first portion of the string of characters can then be generated from the binarized matrix for example by appending the rows of the matrix one after the other to generate the string of characters (numbers).

It is noted that, if necessary or desired, the image may be subjected to processing such as filtering in order to remove imperfections resulting e.g. from imperfect optics, imperfect lighting, or the like. In other words, in an exemplary embodiment, deriving the representation from the image may comprise employing a filtering processing.

In an exemplary embodiment, the set of height levels of the corresponding sections of the at least a part of the surface corresponds to a set of height levels as perceived e.g. by the camera when obtaining the image under a given lighting condition. It is noted that a different lighting condition may thus result in a different set of height levels.

The second portion of the string of characters allows for quantifying differences in strings of characters e.g. as a result of different lighting conditions and/or as a result of differing surface structures. The second portion of the string of characters is generated based on a function of the representation and/or of the first portion of the string of characters, the function being in an exemplary embodiment a mathematical and/or statistical function of the representation and/or of the first portion of the string of characters. For example, the statistical function is in an exemplary embodiment a most-recurring function and/or an averaging function. For example, in a simplified case, a 4×4 matrix representation can be converted into a 2×2 matrix representation by applying e.g. one of such statistical functions to each one of 4 2×2 segments of the 4×4 matrix. Generating the second portion based on the 2×2 matrix allows applying a metric function in a reduced search space. As opposed for example to a hash value and/or a checksum, the statistical function is chosen to be less sensitive to small changes in the first portion of the string of characters and/or the representation. In this way, for example, small variations in lighting conditions when obtaining the image of the at least part of the surface, which may result in small changes in the representation (individual perceived height values) and/or the first portion of the sequence of characters may then result in correspondingly small changes in the second portion of the string of characters. In this way, the second portion of the string of characters is suited to provide a measure for a distance between different strings of characters. For example, a weighted average of values included in the first portion of the string of characters taking into account only values between 80% and 20% of a maximum value of the values of the first portion of the string of characters turned out to be a suitable function for generating the second portion.

Having generated the string of characters, information (e.g. data) representing the string of characters is associated with shipping information of the consignment unit. In an exemplary embodiment, associating the information representing the string of characters with the shipping information of the consignment unit comprises storing or causing storing the information representing the string of characters with the shipping information of the consignment unit. For example, in case the at least one first apparatus corresponds to or is comprised by the dedicated device e.g. installed at a post office, this device may comprise or may be connected to a dedicated database for storing the shipping information in association with the string of characters. Similarly, in case of the at least one first apparatus being a mobile device, the shipping information may be stored in association with the string of characters in a corresponding storage of the mobile device.

In an alternative or additional exemplary embodiment, associating the information representing the string of characters with the shipping information of the consignment unit comprises providing the information representing the string of characters in association with the shipping information of the consignment unit to be accessible by at least one external network device, in particular via a communication path. Thereby, in an exemplary embodiment, the at least one external network device corresponds to or is comprised by a network server and/or server cloud. Thus, for example, the device and/or the mobile device may transmit the information representing the string of characters together with the shipping information to a server and/or server cloud to be stored at the server and/or the server cloud.

In the context of the present disclosure, "communication path" is to be understood as a (bi-directional) wireless and/or wired network connection i.e. a wireless connection that enables a network entity to transmit and receive data via said connection. Examples of a wireless connection include a wireless communication path or link in a wireless communication network, in particular a terrestrial wireless communication network like a Wireless Local Area Network (WLAN) or a cellular network. WLAN is for example specified by the standards of the IEEE 802.11 family (http://www.ieee.org/). A cellular network may for example be a mobile phone network like a 2G/3G/4G/5G cellular communication network. The 2G/3G/4G/5G cellular radio communication standards are developed by the 3GPP and presently available under http://www.3gpp.org/. A wireless connection may further include a Device-to-Device (D2D) communication path. Examples of a wired connection include a Local Area Network (LAN) connection, and/or any further wired computer connection, e.g. a bus, in particular a Universal Serial Bus (USB), connection, and/or in particular an internet connection.

As disclosed above, the method according to the second aspect may be performed as a counterpart to the method according to the first aspect, e.g. by a device at a postal facility, e.g. at a post office. The method according to the first aspect being applicable e.g. at a device of a customer for associating information representative of the surface structure (e.g. the fingerprint) of a consignment unit to be returned with corresponding shipping information, the method according to the second aspect may be applicable e.g. at a device at a post office for obtaining the shipping information associated with the surface structure of the consignment unit read at the post office to be used for shipping the consignment unit.

Accordingly, a method according to the second aspect includes obtaining or causing obtaining first information representing a first string of characters with a first portion representative of a set of height levels of corresponding sections of at least a part of a surface of a first consignment unit. Thereby, in an exemplary embodiment, obtaining the first information comprises obtaining an image of at least a part of a surface of the consignment unit. In particular, in an exemplary embodiment, obtaining the first information comprises obtaining an image of at least a part of a surface of the first consignment unit corresponding to or comprising at least in part at least one of a bare surface portion of the consignment unit and of at least a part of a label of the consignment unit. In other words, in an exemplary embodiment, obtaining or causing obtaining the image comprises obtaining or causing obtaining the image of at least a part of a bare surface portion of the consignment unit and/or of at least a part of a label of the consignment unit. Thus, as in case of the method according to the first aspect, the at least one second apparatus may comprise or correspond to a device connected to and/or comprising a digital camera or digital scanner and may thus be configured to obtain the image (e.g. a digital image) using the digital camera and/or the scanner.

Further, as in the case of the method according to the first aspect, in an exemplary embodiment, obtaining the first information comprises deriving or causing deriving a representation as discussed in case of the first aspect, the representation being a representation of the at least a part of the surface from the image, the representation comprising a set of values respectively representing a corresponding set of height levels of corresponding sections of the at least a part of the surface. Further, in an exemplary embodiment, obtaining the first information comprises generating the first string of characters based on the representation of the at least a part of the surface. In an exemplary embodiment, the first string of characters comprises a second portion, and the second portion of the first string of characters is generated based on the function of the representation and/or of the first portion of the first string of characters as discussed in case of the method according to the first aspect.

Alternatively, or in addition, in an exemplary embodiment, obtaining the first information comprises receiving or causing receiving the first information via a network connection. Thereby, in an exemplary embodiment, the network connection comprises or corresponds to a communication path as disclosed above. Thus, in this embodiment, the at least one second apparatus may be comprised by or correspond to a network server and/or server cloud configured for carrying out processes of the method according to the second aspect.

In an exemplary embodiment, determining or causing determining, based on the obtained first information, whether or not the first string of characters is present in a database comprises comparing the first string of characters to at least one string of characters present in the database and determining whether or not the at least one string of characters present in the data base is equal to the first string of characters.

In an exemplary embodiment, determining, based on the obtained first information, whether or not the first string of characters is present in a database comprises determining or causing determining, based on the obtained first information, whether or not the first string of characters is stored in the database in association with shipping information of the first consignment unit. In a further exemplary embodiment, the database is comprised by the at least one second apparatus and/or is connected to the at least one second apparatus via a wired and/or wireless network connection, whereby in an exemplary embodiment, the network connection corresponds to or comprises the above disclosed communication path. In the latter case, the database may e.g. be storage accessible via a network, e.g. storage comprised by or connected to a network server and/or a network server cloud.

If the method according to the second aspect determines that the first string of characters (and/or information thereof) is present in a database, the method according to the second aspect comprises outputting or causing outputting shipping information associated with information representing the first string of characters in the database and/or outputting or causing outputting a control signal based on the shipping information for causing an external apparatus to perform a predetermined operation. As disclosed above, in exemplary embodiments, the shipping information may be output by being displayed on a display of or connected with the at least one second apparatus, by being printed by the at least one second apparatus and/or by a printing device connected to the at least one second apparatus, or a control signal may be output for causing display of the shipping information by being print-out, and/or a control signal may be output based on the shipping information for causing an external device (e.g. a control device of a conveyor belt or a different transport apparatus) to cause a predetermined operation.

In an exemplary embodiment, if the first string of characters is not present in the database, the method comprises determining, based on a metric function, whether or not at least one second string of characters is present in the database, a distance of which to the first string of characters is below a first predefined threshold. In other words, if no exact match is present in the database, the method determines whether or not a string of characters (a code) is stored in the database that is similar to the string of characters of the consignment unit under inspection.

As mentioned above, the second portion of the string of characters is generated using a function that varies little if perceived height levels vary little accordingly. It may for example be assumed that lighting conditions are different when inspecting a consignment unit as compared to lighting conditions when a string of characters was initially associated with shipping information of the consignment unit e.g. shortly after the consignment unit was generated. While such lighting conditions may result in variations in height levels perceived by corresponding cameras, the function for generating the second portion is chosen such that such variations in lighting conditions result in smooth (continuous), small variations of strings of characters generated from images taken under such differing lighting conditions. Applying the metric function to such strings of characters that correspond to a same consignment unit but are derived from images of the consignment unit taken under differing lighting conditions may thus result in a distance value that is below a suitably defined threshold.

It is noted that a metric function is in an exemplary embodiment defined such that two identical strings or respective portions thereof have a distance of zero and that a triangular inequality allows sorting of strings and/or indexing of strings based on the metric function. In an exemplary embodiment, the metric function corresponds to or is based on a discrete metric, and may for example be based on counting a number of equal elements in respective matrices representing respective surface portions. In an alternative element, a metric is a Euclidian metric.

Further, if at least one second string of characters is present in the database, the distance of which to the first string of characters is below the first predefined threshold, the method according to the second aspect comprises, in analogy to the case disclosed above, at least one of (a), (b):
  (a) outputting or causing outputting shipping information associated with information representing the at least one second string of characters in the database;
  (b) outputting or causing outputting a control signal based on the shipping information associated with information representing the at least one second string of characters for causing the external apparatus to perform the predetermined operation.

Thus, in the exemplary embodiment, the method according to the second aspect advantageously allows not only searching the database for exact matches of a given string of characters for example implying that lighting conditions at a registering stage (e.g. when employing the method according to the first aspect) are the same also at a retrieving stage when the string of characters is used for retrieving shipping information (e.g. when employing the method according to the second aspect). To the contrary, by including the second portion into the string of characters, the method allows for retrieving shipping information also in cases in which lighting conditions at the registering stage and the retrieving stage differ.

In order to further enhance reliability of verifying a consignment unit, in an exemplary embodiment, if the first string of characters is not found in the database, i.e. if no exact match is found, the method according to the second aspect may generate variations (at least one variation) of the first string of characters representing the structure (e.g. the microstructure) of the at least a part of the surface of the first consignment unit as perceived under different lighting conditions (at least one different lighting condition). Thereby, a different lighting condition corresponds to a different set of (perceived) height levels.

To this end, the method according to the second aspect may in an exemplary embodiment generate (or cause generating) at least one first model string of characters (at least one modelled variation of the first string of characters) representative of a first model set of height levels of corresponding sections of the at least a part of the surface of the first consignment unit, e.g. by (e.g. mathematically) simulating the perceived height levels under a different lighting condition and the corresponding representation. Thus, in an exemplary embodiment, the method according to the second aspect further comprises a step (a) of obtaining or causing obtaining at least second information representing at least one first model string of characters with a first portion representative of a first model set of height levels of the corresponding sections of the at least a part of the surface of the first consignment unit. In an exemplary embodiment, the first model set of height levels corresponds to a set of height levels as perceived, e.g. by a camera, e.g. comprised by or connected to the at least one second apparatus, under a different lighting condition as in case of the set of height levels corresponding to the first portion of the first string of characters. Modeling the height levels under a corresponding different lighting condition, in an exemplary embodiment, the method according to the second aspect comprises for each one of the at least one first model string of characters, obtaining the first model set of height levels of the corresponding sections of the at least a part of the surface of the first consignment unit by calculating the height levels of the corresponding sections assuming different lighting conditions.

Having thus generated the variations (at least one variation) of the first string of characters representing the structure (e.g. the microstructure) of the at least a part of the surface of the first consignment unit as perceived under different lighting conditions (at least one different lighting condition), the method according to the second aspect may in this embodiment determine whether or not a string of characters is present in the database that is similar to any one or more of the generated variations of the first string of characters (and/or to the first string of characters). Thus, the method according to the second aspect comprises in an exemplary embodiment a step (b) of determining, based on a metric function, whether or not at least one second string of characters is present in the database, a distance of which to the at least one first model string of characters is below a second predefined threshold (which may correspond to the first predefined threshold). Here, the metric function may correspond to the metric function disclosed above. Then, in a case in which at least one second string of characters is present in the database, the distance of which to the at least one first string of characters and/or the first model string of characters is below the second predefined threshold, the method comprises at least one of steps (c1), (c2):

(c1) outputting or causing outputting shipping information associated with information representing the at least one second string of characters in the database;

(c2) outputting or causing outputting a control signal based on the shipping information associated with information representing the at least one second string of characters for causing the external apparatus to perform the predetermined operation.

In an exemplary embodiment, if at least one second string of characters is determined to be present in the database, the at least one second string of characters comprising a first portion representative of a set of height levels of corresponding sections of at least a part of a surface of at least one respective second consignment unit (corresponding to the first consignment unit as perceived under (hypothetical) different lighting conditions) corresponding to the at least one second string of characters and the distance of which to the first string of characters and/or to the at least one first model string of characters is below the first and/or the second predefined threshold, the method further comprises the following steps (a), (b) and (c). In other words, in case at least one second string is present in the database, that is associated with a corresponding (at least one) second consignment unit, whereby a distance (a similarity) of the at least one second string is below a predefined threshold value, in the exemplary embodiment, the method according to the second aspect performs the following steps (a), (b) and (c).

In a step (a), as in case of the first string of characters disclosed above, the method generates variations (at least one variation) representing the structure (e.g. the microstructure) of the at least a part of the surface of the at least one second consignment unit as perceived under further different lighting conditions (at least one different lighting condition). Again, a different lighting condition corresponds to a different set of (perceived) height levels. Thus, in the exemplary embodiment the step (a) is a step of obtaining or causing obtaining, for each one of the at least one second string of characters, at least third information representing at least one respective second model string of characters corresponding to the at least one second string of characters with a first portion being representative of a second model set of height levels of corresponding sections of at least a part of the surface of the respective second consignment unit corresponding to the at least one second string of characters. As in case of the first model string(s) of characters disclosed above, in an exemplary embodiment for each one of the at least one second model string of characters the second model set of height levels of the corresponding sections of the at least a part of the surface of the second consignment unit is obtained by calculating the height levels of the corresponding sections assuming different lighting conditions.

Then, the variations of the second string of characters and/or the second string of characters are compared to the variations of the first string of characters and/or the first string of characters in order to determine a pair of second string of characters or variation thereof and first string of characters or variation thereof for which a corresponding distance is smallest (and corresponding similarity is highest) and/or whether or not such pair exists in the database, a mutual distance of which is below a third predefined threshold (which may correspond to any one of the first or the second predefined threshold).

It is noted that in all cases discussed herein, a distance between a given string of characters (e.g. the first string of characters, the at least one first model string of characters, the second string of characters, and/or the at least one second model string of characters) and a different string of characters (e.g. a different one of the first string of characters, the at least one first model string of characters, the second string of characters, and/or the at least one second model string of characters) is in an exemplary embodiment determined based on a metric function (e.g. the metric function disclosed above) and based on a second portion comprised by the first string of characters, the at least one first model string of characters, the second string of characters, and/or the at least one second model string of characters.

In other words, in an exemplary embodiment, the first string of characters, the at least one second string of characters, the at least one first model string of characters and the at least one second model string of characters each comprise respective second portions; and wherein respective mutual distances between the first string of characters, the at least one second string of characters, the at least one first model string of characters and the at least one second model string of characters are determined based on the metric function and based on the respective second portions.

For example, in this way, it may be determined whether or not such pair exists in the database, a mutual distance of which is below the third predefined threshold. In other words, in an exemplary embodiment, the step (b) is a step of determining or causing determining whether or not at least one string of characters of the at least one second string of characters and the at least one corresponding second model string of characters is present in the database for which a distance to any one of the first string of characters and the at least one first model string of characters is below a third predefined threshold.

Having determined whether or not such string is present in the database, the method may further proceed to step (c1) and/or (c2) in analogy to the corresponding steps disclosed above:
- (c1) outputting or causing outputting shipping information associated with information representing the at least one string of characters of the at least one second string of characters and the at least one corresponding second model string of characters in the database;
- (c2) outputting or causing outputting a control signal based on the shipping information associated with information representing the at least one string of characters of the at least one second string of characters and the at least one corresponding second model string of characters for causing the external apparatus to perform the predetermined operation.

It is noted that in an alternative case, in an exemplary embodiment, in which no pair is determined for which the distance is below the third predefined threshold, the method comprises a step (d) of outputting or causing outputting, in particular via a display of the at least one second apparatus, corresponding information (e.g. "consignment unit not accepted").

In order to further improve reliability of a registering method (e.g. of the method according to the first aspect) and of a retrieving method (e.g. of the method according to the second aspect), the string of characters, the first string of characters, the second string of characters, the at least one first model string of characters, and/or the second model string of characters further comprises a third portion different from the first and/or the second portion and being determined based on a hash function of the first portion and/or the second portion and/or comprising a checksum of the first portion and/or the second portion. For example, using a hash function, for example the first portion of the string of characters can be mapped to a corresponding hash code of predefined size. Alternatively, or in addition, the third portion may comprise a checksum e.g. of the first portion of the string of characters which may advantageously employed to detect errors that may have occurred when handling any string of characters and/or to verify corresponding data integrity.

As mentioned above, in an exemplary embodiment of the first and/or the second aspect, obtaining the image comprises obtaining the image using a digital camera or a scanner. As further mentioned above, a set of height values may vary in accordance with lighting conditions employed during the registering stage and/or the verification stage. In this connection, it was found that precision and reliability of the methods according to the first and the second aspects may even further be enhanced by controlling the lighting conditions during the registering and/or during the verification stage. It was in particular found that use of a particular light source may have an advantageous effect, e.g. depending on the consignment unit. Thus, in an exemplary embodiment of the first and/or the second aspect, obtaining the image of the at least a part of the surface comprises applying or causing applying ultraviolet, UV, infrared, IR, and/or white light to the at least a part of the surface.

As disclosed above, the methods according to the first and the second aspect may be advantageously employed for registering shipping information in association with information representative of a surface structure of a consignment unit (the method according to the first aspect) and for retrieving the shipping information based on the surface structure of the consignment unit (the method according to the second aspect).

It is noted that in an additional exemplary embodiment, the method according to the first aspect further comprises:
- obtaining or causing obtaining position information of the at least one first apparatus; and
- associating or causing associating the information representing the string of characters with the position information.

Thereby, in an exemplary embodiment, the position information is position information defined based on a GNSS (Global Navigation Satellite System), in particular GPS information.

The position information may for example be used to confirm reliability of the string of characters and thereby of the shipping information associated with the string of characters.

Accordingly, the method according to the second aspect comprises:
- if the first string of characters is present in the database, and/or if at least one second string of characters is present in the database, the distance of which to the first string of characters is below the first predefined threshold, and/or if at least one second string of characters is present in the database, the distance of which to the at least one first model string of characters and/or the first string of characters is below the second predefined threshold and/or if at least one string of characters of the at least one second string of characters and the at least one corresponding second model string of characters is found, the distance of which to any one of the first string of characters and/or the at least one first model string of characters is below the third predefined threshold, the method further comprises at least one of:
- obtaining or causing obtaining position information associated with the first string of characters in the database; and
- causing a predetermined operation based on the obtained position information.

Thereby, in an exemplary embodiment, the predetermined operation comprises at least one of:
- outputting or causing outputting information based on the position information, e.g. via a display comprised by or connected to the at least one second apparatus;

confirming or rejecting the first string of characters and/or the shipping information associated with the first string of characters.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 7A is a first part of a flow chart illustrating a further exemplary embodiment of a method according to the invention;

DETAILED DESCRIPTION OF EXAMPLE EMBODIMENTS OF THE INVENTION

Figure 1:
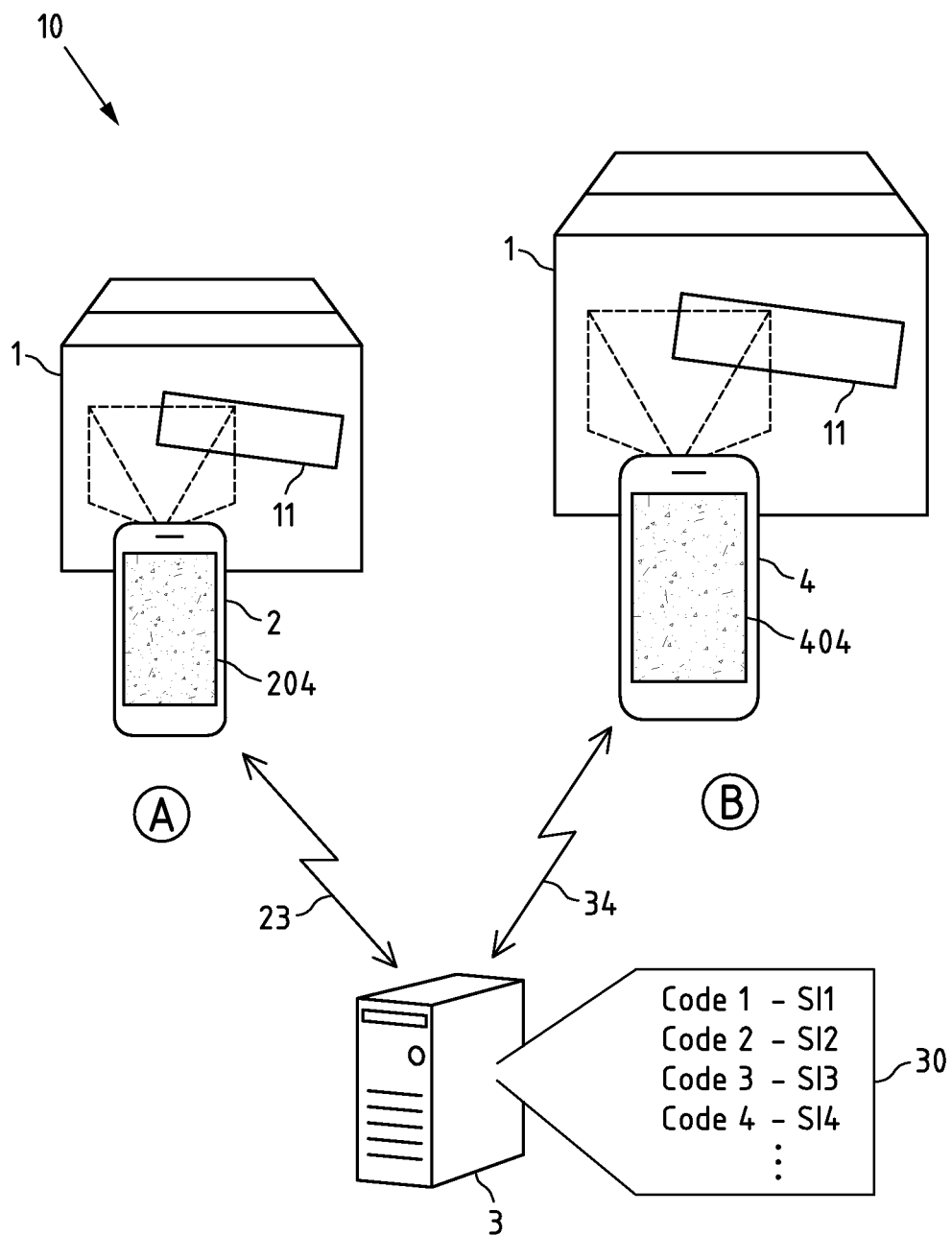
FIG. 1 is a block diagram of an exemplary embodiment of a system according to the invention.

FIG. 1 is a schematic illustration of an example embodiment of a system 10 comprising a mobile device 2 (an example of the at least one first apparatus), a mobile device 4 (an example of the at least one second apparatus) and a server 3 storing database 30. Database 30 exemplarily stores respective strings of characters ("Code 1", "Code 2", "Code 3", "Code 4", . . . ) in association with corresponding shipping information ("SI 1", "SI 2", "SI 3", "SI 4", . . . ). While mobile device 4 is exemplarily illustrated as a smartphone, mobile device 4 may correspond likewise to a handheld computing device to be used by staff member of a post office. Instead, a dedicated device comprising a camera/scanner and/or a printing device fixedly and/or removable installed at a post office may be employed as an example of the at least one second apparatus. Further, each of mobile device 2 and mobile device 4 comprises or is connected to a camera (not shown) for acquiring an image of a consignment unit 1 (an example of a consignment unit addressable by a method according to the first and by a method according to the second aspect) shown in FIG. 1. As illustrated, both mobile device 2 and mobile device 4 obtain an image of at least a part of a surface of consignment unit 1 in the exemplary case by acquiring an image of a part of a bare surface of consignment unit 1 and of a part of a label 11 of consignment unit 1.

While in the following, mobile device 4 is described as an example of the at least one second apparatus, it is noted that in particular server 3 may in an alternative or additional embodiment take the role of the at least one second apparatus, e.g. and may thus be configured for performing the steps of the method according to the second aspect.

Turning back to FIG. 1, consignment unit 1 may include one or more products ordered by a customer which the customer intends to return. Label 11 may thus correspond to the label initially used for shipping consignment unit 1 to the customer and may still be attached to the consignment unit 1. Stage A of FIG. 1 thus corresponds to the disclosed registration stage at which the customer uses his mobile device 2 for obtaining the image of the part of the surface of the consignment unit 1 and for associating a string of characters generated based thereon (as fingerprint of the consignment unit 1) with shipping information of the consignment unit 1. Further, stage B of FIG. 1 corresponds to the disclosed retrieving stage in which, e.g. at a post office, the shipment information is retrieved based on the surface structure of consignment unit 1.

More specifically, as shown in FIG. 1, mobile device 2 acquires (an example of obtaining) an image of at least part of a surface of consignment unit 1. Based on the obtained image, mobile device 2 then derives a representation of the at least a part of the surface from the image, e.g. a two-dimensional matrix comprising a set of values respectively representing a corresponding set of height levels of corresponding sections of the at least a part of the surface. Based on the representation, mobile device 2 then generates a string of characters (a code) comprising a first portion representative of the set of height levels and a second portion generated based on a function (a mathematical function) of the first portion. In an exemplary embodiment, the code further comprises a third portion which corresponds to or comprises in particular a checksum of the first portion. Mobile device 2 then associates information (e.g. data) representing the string of characters with shipping information of the consignment unit. Thereby, the shipping information may be manually input by the customer, e.g. by selecting corresponding information in an application e.g. provided by a postal services provider as disclosed above which may in addition be employed for acquiring the image of the part of the surface of the consignment unit. Alternatively, or in addition, the shipment information may be obtained based on the label 11 still present on the consignment unit 11. For example, customer details such as the customer name and/or address may be read by mobile device 2 from label 11. These customer details may be linked with an address of the shop to which the customer intends to return the consignment unit 1 e.g. in server 3 and may be obtained by mobile device 2 automatically via communication with server 3 via communication path 23. In addition, or alternatively, such information may be obtained based on a one- or two-dimensional barcode present on the surface of the consignment unit 1 and/or present on the label 11.

Associating the information (e.g. the data) representing the string of characters with the shipping information of the consignment unit 1, mobile device 2 may store this information in association at mobile device 2 and/or may transmit the information representing the string of characters in association with the shipping information to server 3 via communication path 23.

As further shown in FIG. 1, at stage B, mobile device 4 performs actions for retrieving the shipping information of consignment unit 1 based on an image obtained of at least part of the surface of consignment unit 1. For example, mobile device 4 obtains an image of at least a part of a surface of consignment unit 1 using e.g. a digital camera comprised by mobile device 4. Based on the obtained image, mobile device 4 then derives a representation of the at least a part of the surface from the image, for example a two-dimensional matrix comprising a set of values respectively representing a corresponding set of height levels of corresponding sections of the at least a part of the surface. It is noted that parameters such as matrix dimension may be preset and may be employed commonly at mobile device 2 and at mobile device 4. Based thereon, mobile device 4 then generates a first string of characters based on the representation of the at least a part of the surface. In this way, mobile device 4 thus obtains first information representing the first string of characters. It is noted that alternatively, mobile device 4 receives the first information via a network connection, for example in a case in which verification processing is outsourced to a network device, e.g. to server 3 which may for example process an image obtained at mobile device 4 and which may sent the first information to device 4 via communication path 34. Based on the obtained first information, mobile device 4 may then determine whether or not the first string of characters is present in a database.

Thereby, as shown in FIG. 1, mobile device 4 may determine, based on the obtained first information, whether or not the first string of characters is present in database 30 via communication with server 3 (an example of an external network device) connected to database 30 via communication path 34. In the affirmative case, mobile device 4 may e.g. output the retrieved shipping information by displaying e.g. the address to which consignment unit 1 is to be shipped using display 404 of mobile device 4 so that a staff member using mobile device 4 may use this information for printing a return label. Alternatively, or in addition, in case mobile device 4 corresponds to a handheld computing device and/or a dedicated device fixedly or removably installed at the post office, mobile device 4 may output the shipping information by printing or causing printing of the return label.

If the first string of characters is not present in the database, mobile device 4 may determine based on the metric function disclosed above, whether or not at least one second string of characters is present in the database, a distance of which to the first string of characters and/or to the at least one first model string of characters disclosed above is below a first predefined threshold. If at least one second string of characters is present in the database, the distance of which to the first string of characters and/or the first model string of characters is below the first predefined threshold, mobile device 4 may the output corresponding shipping information.

It is noted that any of communication paths 23 and 34 described above may be a direct or indirect communication path. For example, any of communication paths 23 and 34 may comprise one or more hops, for example one or more communication links or communication connections. In the context of the present disclosure communication paths are to be understood as (bi-directional) wireless communication connections like 2G/3G/4G/5G cellular wireless connections, Device-to-Device (D2D) communication paths, (bi-directional) wireless communication connections such as Wireless Local Area Network (WLAN) connections, and/or wired computer connections such as buses including in particular USB connections.

Figure 2:
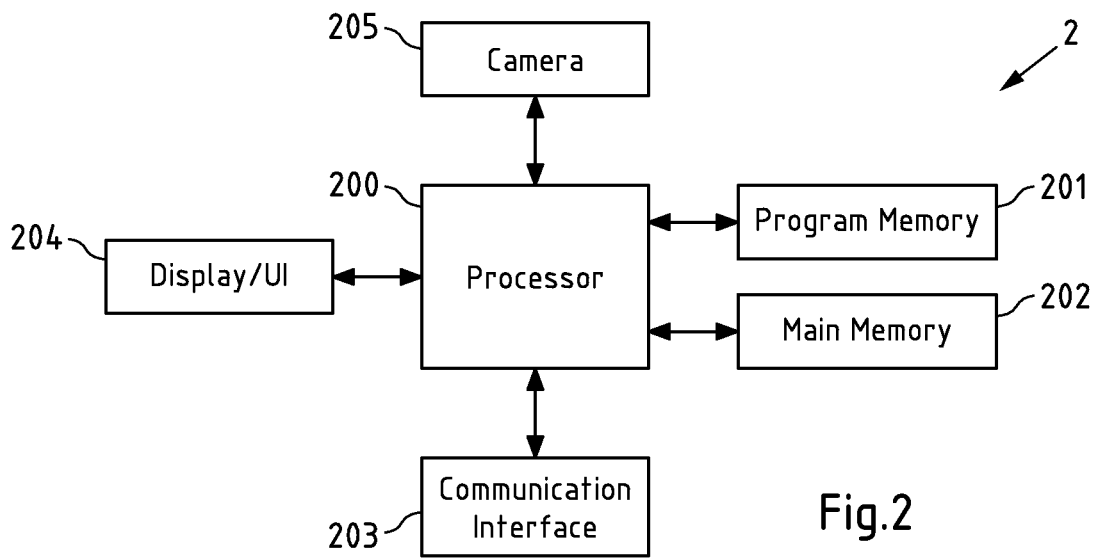
FIG. 2 is a block diagram of an exemplary embodiment of an apparatus according to the first aspect of the invention.

FIG. 2 is a block diagram of an exemplary embodiment of mobile device 2 (an example of the at least one first apparatus). In the following, it is assumed that mobile device 2 of system 10 of FIG. 1 corresponds to mobile device 2 of FIG. 2. Thus, mobile device 2 may be employed by a customer for obtaining an image of part of a surface of consignment unit 1, for generating a string of characters, and for associating information representative of said string with shipping information of consignment unit 1, e.g. by providing said information in association to server 3 via communication path 23.

Mobile device 2 comprises a processor 200. Processor 200 may represent a single processor or two or more processors, which are for instance at least partially coupled, for instance via a bus. Processor 200 executes a computer program code to perform any one embodiment of the disclosed method according to the first aspect (e.g. the steps of any one embodiment of the disclosed method) stored in program memory 201 or a part thereof (e.g. at least some steps of any one embodiment of the disclosed method), and interfaces with a main memory 202. Accordingly, program memory 201 may contain an operating system for processor 200. Some or all of memories 201 and 202 may also be included into processor 200. One of or both of memories 201 and 202 may be fixedly connected to processor 200 or at least partially removable from processor 200, for example in the form of a memory card or stick.

Processor 200 further controls a communication interface 203 which is configured to communicate via a communication network. Mobile device 2 may use communication interface 203 in particular to communicate with external network devices such as server 3 (via communication path 23). In the following, it is assumed that communication interface 203 is a wireless or wired communication interface configured for communicating using (bi-directional) communication connections like 2G/3G/4G/5G cellular wireless connections, Device-to-Device (D2D) communication paths, (bi-directional) wireless communication connections such as Wireless Local Area Network (WLAN) connections, or wired computer connections such as buses including in particular USB connections. In an exemplary embodiment, communication interface 203 may be or may comprise a 2G/3G/4G/5G and/or WiFi radio transceiver. For example, mobile device 2 may use communication interface 203 to transmit information representing the string of characters associated with shipping information of the consignment unit 1 to server 3 via communication path 23 to be stored in association in database 30, e.g. after a customer has performed the registration processes disclosed above.

Processor 200 controls display/UI (user interface) 204 on the one hand for outputting information via the display and/or for receiving user input. In other words, display/UI 204 corresponds in an exemplary embodiment to a touch screen by means of which the customer may control the above disclosed application for performing the above disclosed registering processes. While display/UI 204 is exemplarily disclosed as a single integrated component such as a touch screen, it is to be understood that in an alternative exemplary embodiment, the at least one first apparatus comprises a display and a user interface in form of separate components.

Moreover, processor 200 controls a camera 205 (e.g. a digital camera) which is configured for obtaining a digital image of at least a part of a surface of consignment unit 1 (as shown in FIG. 1).

The components 201 to 205 of mobile device 2 may for example be connected with processor 200 by means of one or more serial and/or parallel busses.

Figure 3:
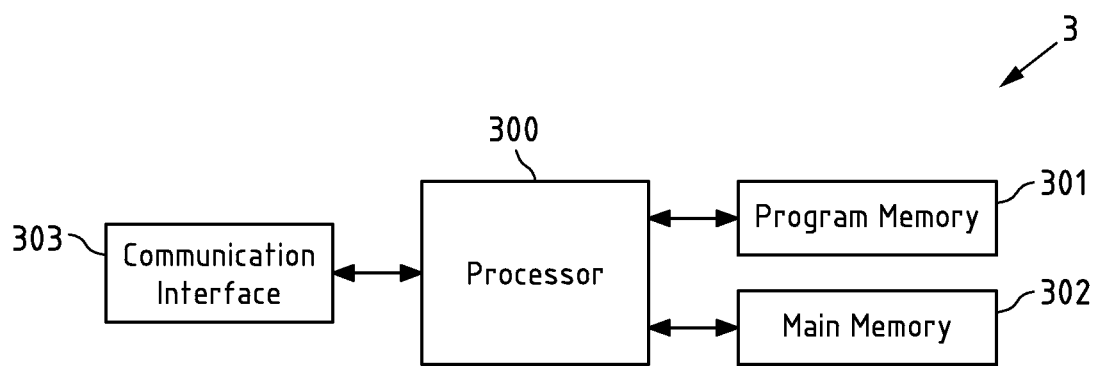
FIG. 3 is a block diagram of an exemplary embodiment of an apparatus according to the first and/or second aspect of the invention.

FIG. 3 is a block diagram of an exemplary embodiment of server 3 (which may be a further example of the at least one first and/or second apparatus). In the following, it is assumed that server 3 of system 10 of FIG. 1 corresponds to server 3 of FIG. 3. Server 3 is an example of the disclosed network device and may correspond to or comprise a network server and/or server cloud connected to a network such as a local area network and/or the Internet.

Server 3 comprises a processor 300. Processor 300 may represent a single processor or two or more processors, which are for instance at least partially coupled, for instance via a bus. Processor 300 executes a computer program code (e.g. computer program code causing server 3 to store information representing a string of characters in association with shipping information of a consignment unit e.g. received from mobile device 2, and/or to obtain first information representing a first string of characters with a first portion representative of a set of height levels of corresponding sections of at least a part of a surface of a first consignment unit, e.g. based on an image received from mobile device 4) stored in program memory 301, and interfaces with a main memory 302. Accordingly, program memory 301 may contain an operating system for processor 300. Some or all of memories 301 and 302 may also be included into processor 300. One of or both of memories 301 and 302 may be fixedly connected to processor 300 or may be at least partially removable from processor 300, for example in the form of a memory card or stick.

Processor 300 further controls a communication interface 303 which is configured for communicating via a communication network. Server 3 may use communication interface 303 to communicate with mobile device 2 and/or with mobile device 4 of system 10 via said local area network and/or the Internet. Communication paths 23 and 34 may thus at least in part correspond to or comprise communication connections within such local area network and/or the Internet. Communication interface 303 may in addition or alternatively correspond to or comprise a wireless communication interface configured for communicating via a cellular network (e.g. to transmit and receive cellular radio signals). For example, communication interface 303 may be or may comprise a 2G/3G/4G/5G radio transceiver. It is however to be understood that the invention is not limited to this. Interface 303 may similarly be a wireless communication interface configured for communicating via a Device-to-Device (D2D) communication path or a (bi-directional) wireless communication connection in a Wireless Local Area Network (WLAN). For example, server 3 may use communication interface 303 to receive information representing a string of characters in association with corresponding shipping information of a consignment unit from mobile device 2 via communication path 23 and/or to transmit stored information to mobile device 4 via communication path 34.

The components 301 to 303 of server 3 may for example be connected with processor 300 by means of one or more serial and/or parallel busses.

It is to be understood that server 3 may comprise various other components like a user interface for receiving user input.

Figure 4:
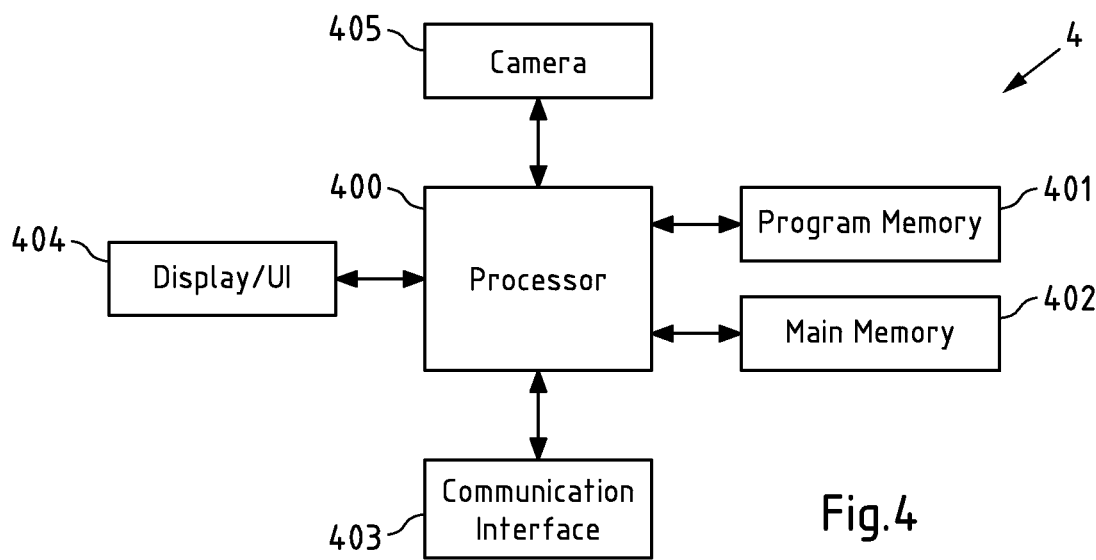
FIG. 4 is a block diagram of a further exemplary embodiment of an apparatus according to the second aspect of the invention.

FIG. 4 is a block diagram of an exemplary embodiment of mobile device 4 (a further example of the at least one second apparatus). In the following, it is assumed that mobile device 4 of FIG. 1 corresponds to mobile device 4 of FIG. 4. Mobile device 4 may thus correspond to a mobile device 4 used by staff member of a post office for retrieving shipping information based on first information representing a first string of characters with a first portion representative of a set of height levels of corresponding sections of at least a part of a surface of consignment unit 1, e.g. from server 3 via communication path 34.

Mobile device 4 comprises a processor 400. Processor 400 may represent a single processor or two or more processors, which are for instance at least partially coupled, for instance via a bus. Processor 400 executes a computer program code stored in program memory 401 (e.g. computer program code causing mobile device 4 to perform any one embodiment of the disclosed method according to the second aspect (e.g. the steps of any one embodiment of the disclosed method) or a part thereof (e.g. at least some steps of any one embodiment of the disclosed method), when executed on processor 400), and interfaces with a main memory 402. Program memory 401 may also contain an operating system for processor 400 and further data. Some or all of memories 401 and 402 may also be included in processor 400. One of or both of memories 401 and 402 may be fixedly connected to processor 400 or at least partially removable from processor 400, for example in the form of a memory card or stick.

A program memory (e.g. program memory 201 and/or program memory 401) may for example be a non-volatile memory. The program memory (e.g. program memory 201 and/or program memory 401) may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 201 and/or main memory 401) may for example be a volatile memory. It may for example be a DRAM memory, to give non-limiting example. It may for instance be used as a working memory for a processor (e.g. processor 200 and/or processor 400) when executing an operating system and/or programs.

Processor 400 further controls a communication interface 403 which is configured to communicate via a communication network. Mobile device 4 may use communication interface 403 to communicate with external network devices such as server 3 (via communication path 34). In the following, it is assumed that communication interface 403 is a wireless or wired communication interface configured for communicating using (bi-directional) communication connections like 2G/3G/4G/5G cellular wireless connections, Device-to-Device (D2D) communication paths, (bi-directional) wireless communication connections such as Wireless Local Area Network (WLAN) connections, or wired computer connections such as buses including in particular USB connections. In an exemplary embodiment, communication interface 403 may be or may comprise a 2G/3G/4G/5G and/or WiFi radio transceiver. For example, mobile device 4 may use communication interface 403 to determine, based on the obtained first information, whether or not the first string of characters is present in database 30 via communication with server 3 via communication path 34.

Processor 400 controls display/UI (user interface) 404 on the one hand for outputting information via the display and/or for receiving user input. In other words, display/UI 404 corresponds in an exemplary embodiment to a touch screen by means of which the customer may control the above disclosed application for performing the above disclosed registering processes. While display/UI 404 is exemplarily disclosed as a single integrated component such as a touch screen, it is to be understood that in an alternative exemplary embodiment, the at least one first apparatus comprises a display and a user interface in form of separate components.

Moreover, processor 400 controls a camera 405 (e.g. a digital camera) configured for obtaining a digital image of at least a part of a surface of consignment unit 1 (as shown in FIG. 1).

The components 401 to 405 of mobile device may for instance be connected with processor 400 by means of one or more serial and/or parallel busses.

It is to be understood that mobile device 4 may comprise various other components like a user interface for receiving user input.

Figure 5:
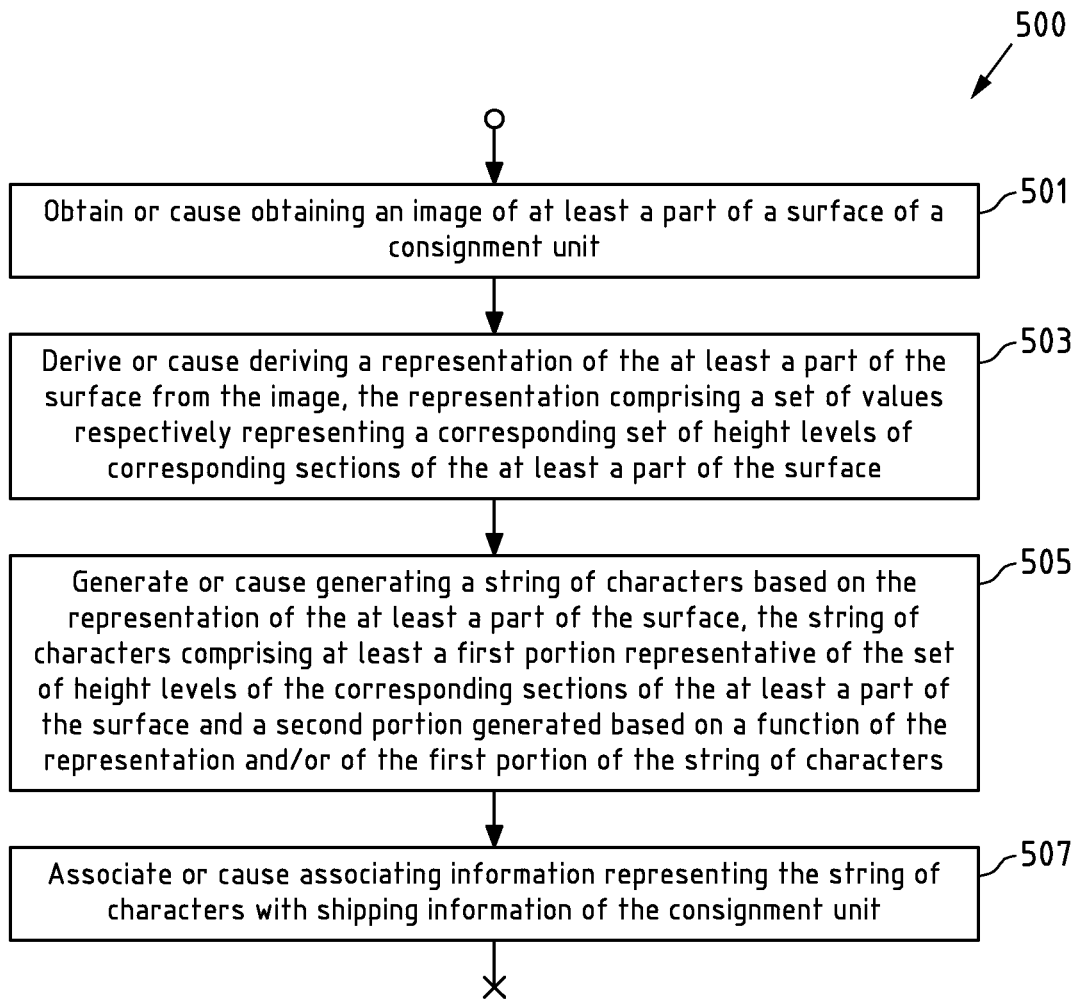
FIG. 5 is a flow chart illustrating an exemplary embodiment of a method according to the first aspect of the invention.

FIG. 5 is a flow chart 500 illustrating an exemplary embodiment of a method according to the first aspect of the invention. Without limiting the scope of the invention, it is assumed in the following that mobile device 2 as disclosed above with respect to FIGS. 1 and 2 performs the steps of flow chart 500. It is noted that the steps of flow chart 500 could likewise be performed at server 3, e.g. when obtaining an image taken at mobile device 2 via network connection 23.

In a step 501, mobile device 2 obtains an image of at least a part of a surface of consignment unit, for example, mobile device 2 obtains an image of at least a part of a surface of consignment unit 1 at registration stage A of FIG. 1, using camera 205 of FIG. 2.

In a step 503, mobile device 2 derives a representation of the at least a part of the surface from the image, the representation comprising a set of values respectively representing a corresponding set of height levels of corresponding sections of the at least a part of the surface. For example, mobile device 2 may perform processes of filtering the image for example for reducing artifacts due to imperfect optics and/or lighting conditions and may thereby optimize the image. Mobile device 2 may then convert the image into a two-dimensional matrix where each dimension represents a corresponding dimension of the image and where each entry represents a corresponding height value of a respective section of the image.

In a step 505, mobile device 2 generates a string of characters based on the representation of the at least a part of the surface, the string of characters comprising at least a first portion representative of the set of height levels of the corresponding sections of the at least a part of the surface and a second portion generated based on a function of the representation and/or of the first portion of the string of characters. In a simple example, mobile device 2 may place the entries of the matrix one after the other in order to obtain the first portion of the string of characters. Based thereon, using a statistical function such as a suitable averaging function, mobile device 2 may generate the second portion of the string of characters as a portion which varies little when entries of the matrix vary little, e.g. as a result of small changes in lighting conditions. As explained above, the string of characters may further comprise a third portion comprising a checksum of the first portion for verifying the string of characters.

In a step 507, mobile device 2 associates information representing the string of characters with shipping information of the consignment unit. For example, mobile device 2 may transmit information representing the string of characters in association with a identification information of a destination of consignment unit 1, e.g. identification information of the shop to which consignment unit 1 is to be returned, e.g. obtained via said application installed at mobile device 2, to server 3 via communication path 23 to be stored in database 30.

Figure 6:
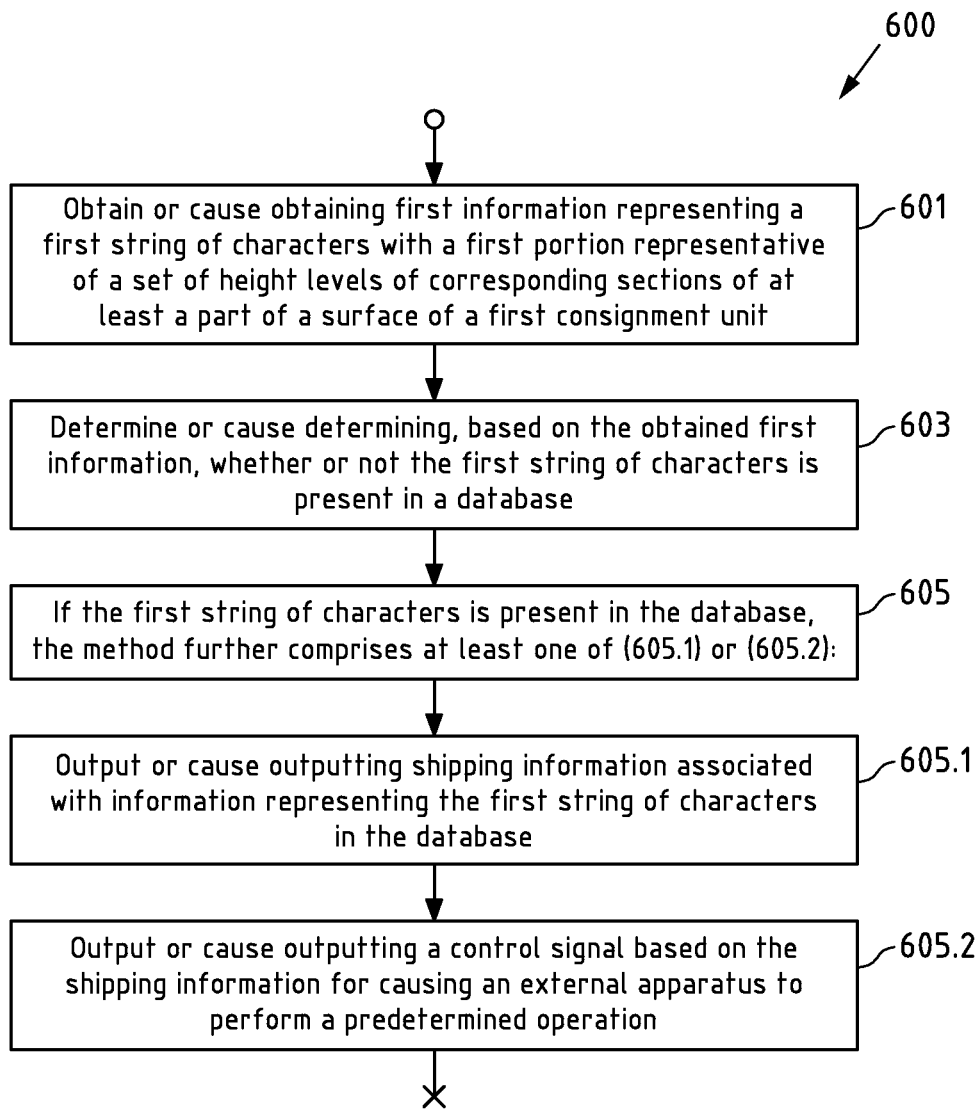
FIG. 6 is a flow chart illustrating an exemplary embodiment of a method according to the second aspect of the invention.

FIG. 6 is a flow chart 600 illustrating an exemplary embodiment of a method according to the second aspect of the invention. Without limiting the scope of the invention, it is assumed in the following that mobile device 4 as disclosed above with respect to FIGS. 1 and 4 performs the steps of flow chart 600. It is noted that the steps of flowchart 600 may further be performed by server 3 of FIG. 1. Further, in alternative embodiments, the steps of flowchart 600 may likewise be performed by one or more fixedly installed devices, installed e.g. at a post office and/or at a facility of a logistics provider where shipping information is retrieved for controlling a predefined operation for storing and/or guiding consignment unit 1 at a given stage of a logistics process.

In a step 601, mobile device 4 obtains first information representing a first string of characters with a first portion representative of a set of height levels of corresponding sections of at least a part of a surface of a first consignment unit. As mentioned above, mobile device 4 may obtain an image of a part of a surface of consignment unit 1 at verification stage B of FIG. 1 using camera 405 of FIG. 4, may derive a representation of the surface from the image and may generate the first string of characters based on the representation. Further, for example, server 3 may perform step 601 by obtaining the first information from mobile device 4 via communication path 34.

In a step 603, mobile device 4 determines, based on the obtained first information, whether or not the first string of characters is present in a database. For example, mobile device 4 may determine whether or not the first string of characters is present in database 30 via communication with server 3 via communication path 34. Alternatively, or in addition, server 3 may perform step 603 by determining whether or not the first string of characters is present in database 30.

In a step 605, if the first string of characters is determined to be present in the database, mobile device 4 turns to step 605.1 and/or to step 605.2. In step 605.1, mobile device 4 outputs shipping information associated with information representing the first string of characters e.g. in database 30, e.g. by displaying corresponding information on display 404 and/or by printing (if mobile device 4 e.g. corresponds to said handheld computing device) or causing a device corresponding to or comprising a printing device to print corresponding information e.g. in form of a label to be attached to consignment unit 1. In step 605.2, mobile device 4 outputs a control signal based on the shipping information for causing an external apparatus to perform a predetermined operation as disclosed above.

Figure 7B:
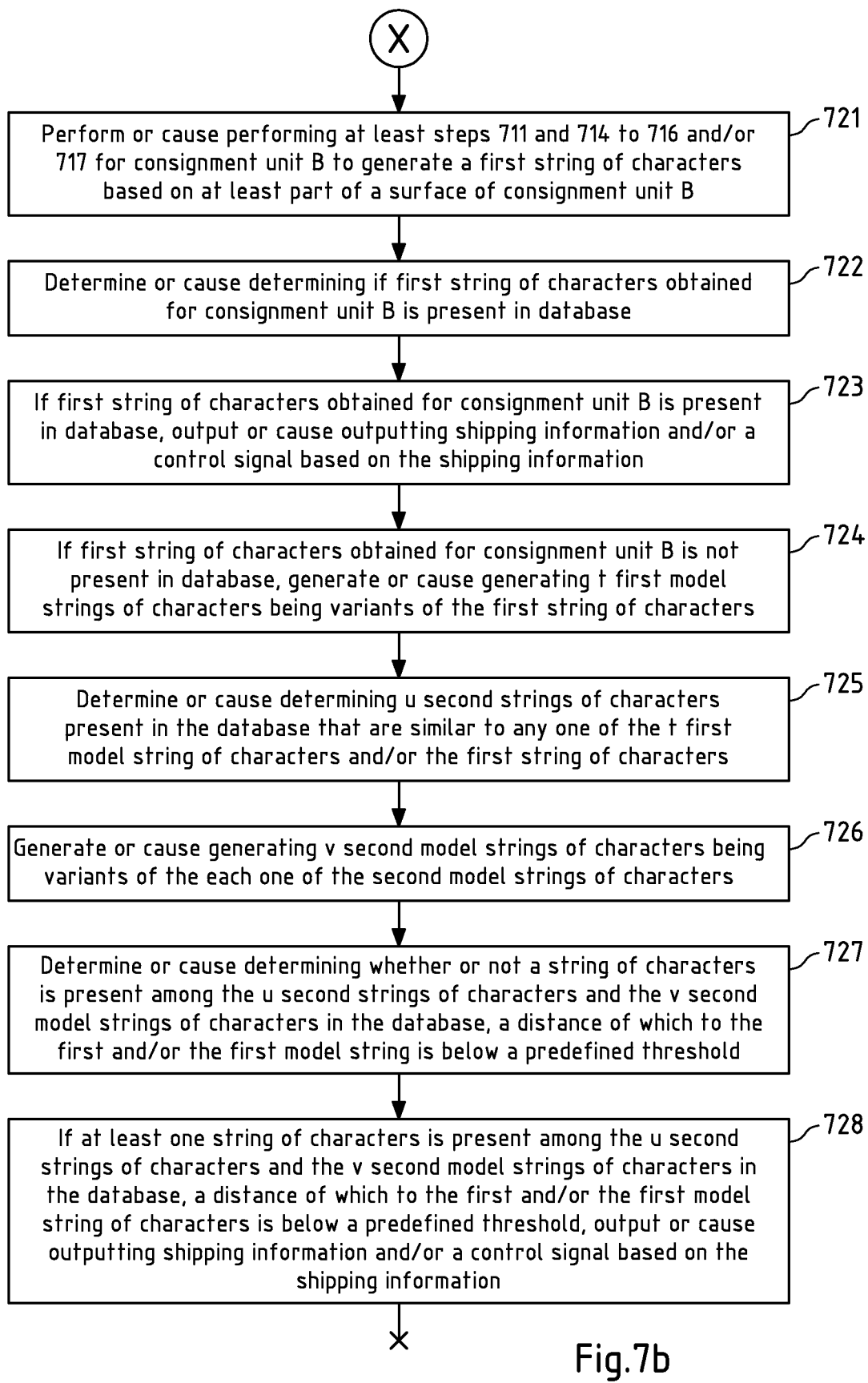
FIG. 7B is a second part of the flow chart of FIG. 7A.

FIG. 7A is a first part of a flow chart illustrating a further exemplary method 700 according to an exemplary embodiment of the invention and FIG. 7B illustrates the second part of method 700.

Without limiting the scope of the invention, it is assumed in the following that steps 711 to 718 of method 700 are exemplary steps of a registration process that may be carried out by mobile device 2, by a smartphone of a customer that intends to return a consignment unit to an online shop where he or she has previously bought one or more products shipped with consignment unit 1. Further, steps 721 to 727 are steps of a retrieving process that may be performed by mobile device 4 as an example of an apparatus according to the second aspect in communication with server 3. It is noted, however, that steps 721 to 727 may be performed e.g. by a dedicated verification device (e.g. installed at a post office and/or at a facility of a logistics provider) with its own database or in communication with a database such as a network based database. In addition, it is noted that steps 711 to 718 and/or steps 721 to 727 may be performed by server 3.

Turning to FIG. 7A, in step 711, mobile device 2 acquires an image of a part of a surface of a consignment unit A, e.g. of consignment unit 1 of the customer. In a step 712 (which may be performed before, after or simultaneously with step 711), mobile device 2 obtains shipping information of consignment unit A, e.g. by user input within the application disclosed above, via explicit user input, e.g. typing an address of the online shop using display/UI 204 and/or automatically, e.g. via reading a label still present on the surface of consignment unit A and/or a bar code (one- or two-dimensional) present on the surface of consignment unit A. As disclosed further herein, shipping information may in particular correspond to identification information and/or to address information of the addressee of consignment unit A.

Based on the obtained image, mobile device 2 generates in step 714 a two dimensional matrix, each entry of the matrix corresponding a perceived height of a corresponding section of the part of the surface of consignment unit A.

It is noted that the method may be further improved in terms of robustness if steps 711 to 714 are applied to more than one part of a surface of consignment unit A. For example, the steps 711 to 714 may be applied to different parts of the surface, the position of which is identifiable for corresponding steps applied in a later verification process such as surfaces with a predefined extension with respect to two or more edges of the consignment unit. In addition, or alternatively, for each or at least one of such two or more parts of the surface to which steps 711 to 714 are applied, for example different resolutions and/or different sizes of the two-dimensional matrix may be applied to introduce further redundancy.

In steps 715 to 717, mobile device 2 generates a first, a second and (optionally) a third portion of a string of characters based on the generated matrix as disclosed in detail above. In step 718, mobile device 2 stores the string of characters in association with the obtained shipping information in a database, e.g. in database 30 via communication with server 3 and/or in a database comprised by mobile device 2.

Thus, performing steps 711 to 718, a customer may have registered a consignment unit for a return shipment by having associated a string of characters representative of the at least part of the surface of the consignment unit as fingerprint of the consignment unit with shipping information identifying the destination of the return shipment. The customer may then return the consignment unit e.g. to a post office where steps 721 to 728 are then performed.

Thus, turning to FIG. 7B, for example a staff member of the post office uses mobile device 4 for performing the steps of FIG. 7B. The staff member may use mobile device 4 firstly to perform in step 721 at least steps 711 and 714 to 716 and/or 717 of FIG. 7A for consignment unit B to generate a first string of characters based on at least part of a surface of consignment unit B. It is noted that while in the present example, consignment unit B (an example of the first consignment unit addressed by a method according to the second aspect) corresponds to consignment unit A (an example of the consignment unit addressed by a method according to the first aspect), FIG. 7B uses a different name as the correspondence is not known to mobile device 4 (an example of the at least one second apparatus).

Then, in step 722, mobile device 4 determines if the first string of characters obtained for consignment unit B is present in a database. For example, mobile device 4 may communicate with server 3 via communication path 34 and may cause server 3 to determine if the first string of characters obtained for consignment unit B is present in database 30. If the first string of characters is determined to be present in database 30, mobile device 4 outputs in step 723 shipping information and/or a control signal based on the shipping information as disclosed above in the context of step 605 of method 600.

Alternatively, if the first string of characters obtained for consignment unit B is determined to be not present in database 30, mobile device 4 generates (or causes server 3 to generate, this optionally being implicit in step 722) t first model strings of characters being variants of the first string of characters in step 724. For example, 10 first model strings of characters may be generated, each model string of characters representing respective heights of the part of the surface as perceived under a different lighting condition.

In a step 725, mobile device 4 obtains (or causes server 3 to obtain, this optionally being implicit in step 722) u second strings of characters present in the database, e.g. in database 30 that are similar to any one of the t first model strings of characters and/or the first string of characters. For example, 7 second strings of characters may be found in database 30, a distance of which to the first string of characters and/or the first model strings of characters (as described above) is below a predetermined threshold (an example of a first or second threshold as referred to herein).

In a step 726, mobile device 4 generates (or causes server 3 to generate, this optionally being implicit in step 722) v second model strings of characters being variants of the each one of the second model strings of characters. For example, 10 second model strings of characters may be generated for each of the 7 second strings of characters.

In a step 727, mobile device 4 determines (or causes server 3 to determine, this optionally being implicit in step 722) whether or not a string of characters is present (among the u second strings of characters and/or the v second model strings of characters) in the database, e.g. in database 30, a distance of which to the first and/or the first model string is below a predefined threshold (an example of the third predefined threshold referred to herein).

For example, the first model string of characters and the 10 first model string of characters (11 strings of characters) may be compared to the second strings of characters and the respective corresponding second model strings of characters (77 strings of characters) to determine if a pair (one of the 11 strings of characters and one of the 77 strings of characters) of strings of characters is present in the database with a distance below a predefined threshold (the third predefined threshold disclosed herein).

In the affirmative case, if at least one string of characters is present among the u second strings of characters and the v second model strings of characters, a distance of which to the first and/or the first model string of characters is below a predefined threshold (the third predefined threshold), mobile device 4 outputs in step 728 the shipping information and/or the control signal based on the shipping information.

In an exemplary embodiment, in the non-affirmative case, if no string of characters is determined to be present among the u second strings of characters and the v second model strings of characters in the database, a distance of which to the first and/or the first model string is below a predefined threshold, mobile device 4 outputs non-affirmative information, e.g. via display 404 (e.g. "No address found"). In this case, the staff member, may for example ask the customer for shipment information, e.g. to generate a label based thereon.

Thus, by using the information derived from the image of a part of a surface of a consignment unit that represents a surface structure, in particular a microstructure, for uniquely identifying the consignment unit, shipping information such as a destination address for a return shipment can be derived e.g. at a post office in a simple, efficient and secure way without a customer being required to print a return label at home. By associating the information representing the string of characters with the shipping information of the consignment unit e.g. already at a customer's home, the customer is in addition not required to take any further items (e.g. a smartphone) to the postal office but only needs to return the bare consignment unit to be returned to the postal office. Yet in addition, no further communication between the customer and e.g. the online shop is required, e.g. to obtain any shipping information needed for return of the consignment unit. Thus, employing the respective methods in accordance with aspects of the invention enables facilitating in particular return delivery processes both for customers and for corresponding shops.

The following example embodiments of the invention are also disclosed:

Embodiment 1

A method performed by at least one first apparatus, the method comprising:
- obtaining or causing obtaining an image of at least a part of a surface of a consignment unit;
- deriving or causing deriving a representation of the at least a part of the surface from the image, the representation comprising a set of values respectively representing a corresponding set of height levels of corresponding sections of the at least a part of the surface;
- generating or causing generating a string of characters based on the representation of the at least a part of the surface, the string of characters comprising at least a first portion representative of the set of height levels of the corresponding sections of the at least a part of the surface and a second portion generated based on a function of the representation and/or of the first portion of the string of characters; and
- associating or causing associating information representing the string of characters with shipping information of the consignment unit.

Embodiment 2

The method according to embodiment 1, wherein associating the information representing the string of characters with the shipping information comprises at least one of the following:
- storing or causing storing the information representing the string of characters with the shipping information of the consignment unit;
- providing or causing providing the information representing the string of characters in association with the shipping information of the consignment unit to be accessible by at least one external network device, in particular via a communication path.

Embodiment 3

The method according to any of embodiments 1 to 2, wherein the at least one external network device corresponds to or is comprised by a network server and/or server cloud.

Embodiment 4

The method according to any of the preceding embodiments further comprising:
- obtaining or causing obtaining the shipping information of the consignment unit in particular based on user input and/or from the consignment unit.

Embodiment 5

The method according to any of the preceding embodiments further comprising:
- obtaining or causing obtaining the shipping information of the consignment unit based on text and/or a one/two-dimensional bar code present on a surface of the consignment unit.

Embodiment 6

A method performed by at least one second apparatus, the method comprising:
- obtaining or causing obtaining first information representing a first string of characters with a first portion representative of a set of height levels of corresponding sections of at least a part of a surface of a first consignment unit;
- determining or causing determining, based on the obtained first information, whether or not the first string of characters is present in a database; and
- if the first string of characters is present in the database, the method further comprises at least one of (a) or (b):
- (a) outputting or causing outputting shipping information associated with the first information representing the first string of characters in the database;
- (b) outputting or causing outputting a control signal based on the shipping information for causing an external apparatus to perform a predetermined operation.

Embodiment 7

The method according to embodiment 6, further comprising:
- if the first string of characters is not present in the database:
- determining or causing determining, based on a metric function, whether or not at least one second string of characters is present in the database, a distance of which to the first string of characters is below a first predefined threshold;
- if at least one second string of characters is present in the database, the distance of which to the first string of characters is below the first predefined threshold, the method further comprises at least one of (a), (b):
- (a) outputting or causing outputting shipping information associated with information representing the at least one second string of characters in the database;
- (b) outputting or causing outputting a control signal based on the shipping information associated with information representing the at least one second string of characters for causing the external apparatus to perform the predetermined operation.

Embodiment 8

The method according to any of the preceding embodiments, wherein the part of the surface of the consignment unit and/or of the first consignment unit corresponds to or comprises at least in part at least one of:
  a bare surface portion of the consignment unit;
  at least a part of a label of the consignment unit.

Embodiment 9

The method according to any of embodiments 6 to 8, further comprising:
  if the first string of characters is not present in the database, the method further comprises the following steps (a), (b), and (c):
  (a) obtaining or causing obtaining at least second information representing at least one first model string of characters with a first portion representative of a first model set of height levels of the corresponding sections of the at least a part of the surface of the first consignment unit;
  (b) determining or causing determining, based on a metric function, whether or not at least one second string of characters is present in the database, a distance of which to the at least one first model string of characters and/or the first string of characters is below a second predefined threshold;
  (c) if at least one second string of characters is present in the database, the distance of which to the at least one first model string of characters and/or the first string of characters is below the second predefined threshold, the method further comprises at least one of (c1), (c2):
  (c1) outputting or causing outputting shipping information associated with information representing the at least one second string of characters in the database;
  (c2) outputting or causing outputting a control signal based on the shipping information associated with information representing the at least one second string of characters for causing the external apparatus to perform the predetermined operation.

Embodiment 10

The method according to embodiment 9, further comprising:
  if at least one second string of characters is determined to be present in the database, the at least one second string of characters comprising a first portion representative of a set of height levels of corresponding sections of at least a part of a surface of at least one respective second consignment unit corresponding to the at least one second string of characters and the distance of which to the first string of characters and/or to the at least one first model string of characters is below the first and/or the second predefined threshold, the method further comprises the following steps (a), (b) and (c):
  (a) obtaining or causing obtaining, for each one of the at least one second string of characters, at least third information representing at least one respective second model string of characters corresponding to the at least one second string of characters with a first portion being representative of a second model set of height levels of corresponding sections of at least a part of the surface of the respective second consignment unit corresponding to the at least one second string of characters;
  (b) determining or causing determining whether or not at least one string of characters of the at least one second string of characters and the at least one corresponding second model string of characters is present in the database for which a distance to any one of the first string of characters and/or the at least one first model string of characters is below a third predefined threshold; and
  (c) if at least one string of characters of the at least one second string of characters and the at least one corresponding second model string of characters is found, the distance of which to any one of the first string of characters and/or the at least one first model string of characters is below the third predefined threshold, the method further comprises at least one of (c1), (c2):
  (c1) outputting or causing outputting shipping information associated with information representing the at least one string of characters of the at least one second string of characters and the at least one corresponding second model string of characters in the database;
  (c2) outputting or causing outputting a control signal based on the shipping information associated with information representing the at least one string of characters of the at least one second string of characters and the at least one corresponding second model string of characters for causing the external apparatus to perform the predetermined operation.

Embodiment 11

The method according to any of embodiments 6 to 10,
  wherein for each one of the at least one first model string of characters, the first model set of height levels of the corresponding sections of the at least a part of the surface of the first consignment unit is obtained by calculating the height levels of the corresponding sections assuming different lighting conditions; and/or
  wherein for each one of the at least one second model string of characters, the second model set of height levels of the corresponding sections of the at least a part of the surface of the second consignment unit is obtained by calculating the height levels of the corresponding sections assuming different lighting conditions.

Embodiment 12

The method according to any of embodiments 6 to 11, wherein the first string of characters, the at least one second string of characters, the at least one first model string of characters and the at least one second model string of characters each comprise respective second portions; and wherein respective mutual distances between the first string of characters, the at least one second string of characters, the at least one first model string of characters and the at least one second model string of characters are determined based on the metric function and based on the respective second portions.

Embodiment 13

The method according to any of embodiments 6 to 12, wherein obtaining the first information comprises:
  obtaining or causing obtaining an image of at least a part of a surface of the first consignment unit;
  deriving or causing deriving a representation of the at least a part of the surface from the image, the representation comprising a set of values respectively representing a corresponding set of height levels of corresponding sections of the at least a part of the surface;

generating or causing generating the first string of characters based on the representation of the at least a part of the surface; or receiving or causing receiving the first information via a network connection, in particular via the communication path.

Embodiment 14

The method according to any of the preceding embodiments 2 to 13, wherein a communication path corresponds to or comprises a (bi-directional) wireless and/or wired network connection, and/or in particular an internet connection.

Embodiment 15

The method according to embodiment 14, wherein a wireless network connection corresponds to or comprises at least one wireless communication path or link in a wireless communication network, in particular a terrestrial wireless communication network like a Wireless Local Area Network (WLAN) and/or a cellular network, and/or in particular an internet connection.

Embodiment 16

The method according to embodiment 15, wherein a cellular network corresponds to or comprises at least one mobile phone network, e.g. a 2G/3G/4G/5G cellular communication network.

Embodiment 17

The method according to any of embodiments 14 to 16, wherein a wired network connection corresponds to or comprises at least one Local Area Network (LAN) connection, and/or any further wired computer connection, e.g. a bus, in particular a Universal Serial Bus (USB), connection, and/or in particular an interne connection.

Embodiment 18

The method according to any of the preceding embodiments, wherein deriving the representation corresponds to or comprises:
converting or causing converting the image into a two-dimensional matrix, in particular wherein each dimension of the matrix corresponds to a spatial dimension of the image and/or consignment unit, in particular wherein each entry of the matrix represents a height of a corresponding section of the image.

Embodiment 19

The method according to any of embodiments 6 to 18, wherein a second portion of the first string of characters is generated based on a function of the representation and/or of the first portion of the first string of characters.

Embodiment 20

The method according to any of the preceding embodiments, wherein obtaining the image comprises obtaining or causing obtaining the image of at least a part of:

a bare surface portion of the consignment unit;
a part of a label of the consignment unit.

Embodiment 21

The method according to any of embodiments 13 to 20, wherein obtaining the image of the at least a part of the surface comprises:
applying or causing applying ultraviolet, UV, infrared, IR, and/or white light to the at least a part of the surface.

Embodiment 22

The method according to any of the preceding embodiments, wherein the string of characters, the first string of characters, the second string of characters, the at least one first model string of characters, and/or the second model string of characters further comprises a third portion different from the first and/or the second portion and being determined based on a hash function of the first portion and/or the second portion and/or comprising a checksum of the first portion and/or the second portion.

Embodiment 23

The method according to any of the preceding embodiments, wherein the shipping information comprises at least one of the following:
sender information;
recipient information;
shipping carrier information;
logistics company information;
delivery-related information (e.g. priority information, e.g. indicating whether the consignment unit shall be delivered with higher or lower priority).

Embodiment 24

The method according to any of the preceding embodiments, wherein the consignment unit corresponds to or comprises a letter, a parcel and/or a transport box.

Embodiment 25

The method according to any of the preceding embodiments, wherein the at least one first apparatus and/or the at least one second apparatus comprise or correspond to a mobile device.

Embodiment 26

The method according to embodiment 25, wherein a mobile device corresponds to or comprises, a handheld computing device in particular comprising or connected to a printing device, a smartphone, a tablet computer, a notebook computer, a smart watch, and a smart band and/or an Internet-of-Things (IoT) device.

Embodiment 27

The method according to any of the preceding embodiments, wherein the at last one second apparatus comprises or corresponds to a network server and/or server cloud configured for carrying out at least any one or more of the steps of the method according to the second aspect and/or of any embodiment thereof.

Embodiment 28

The method according to any of the preceding embodiments, further comprising:
  obtaining or causing obtaining position information of the at least one first apparatus; and
  associating or causing associating the information representing the string of characters with the position information.

Embodiment 29

The method according to embodiment 28, wherein the position information is position information defined based on a GNSS (Global Navigation Satellite System), in particular GPS information.

Embodiment 30

The method according to any of embodiments 28 or 29, further comprising:
  if the first string of characters is present in the database, and/or if at least one second string of characters is present in the database, the distance of which to the first string of characters is below the first predefined threshold, and/or if at least one second string of characters is present in the database, the distance of which to the at least one first model string of characters and/or the first string of characters is below the second predefined threshold and/or if at least one string of characters of the at least one second string of characters and the at least one corresponding second model string of characters is found, the distance of which to any one of the first string of characters and/or the at least one first model string of characters is below the third predefined threshold, the method further comprises at least one of:
  obtaining or causing obtaining position information associated with the first string of characters in the database; and
  causing a predetermined operation based on the obtained position information.

Embodiment 31

The method according to any of embodiments 28 to 30, further comprising
Thereby, in an exemplary embodiment, the predetermined operation comprises at least one of:
  outputting or causing outputting information based on the position information, e.g. via a display comprised by or connected to the at least one second apparatus;
  confirming or rejecting the first string of characters and/or the shipping information associated with the first string of characters.

Embodiment 32

An apparatus comprising at least one processor and at least one memory that contains program code, wherein the memory and the program code are configured to use the at least one processor to cause an apparatus to perform and/or control at least the method of any of embodiments 1 to 5.

Embodiment 33

An apparatus comprising at least one processor and at least one memory that contains program code, wherein the memory and the program code are configured to use the at least one processor to cause an apparatus to perform and/or control at least the method of any of embodiments 6 to 31.

Embodiment 34

System comprising at least one first apparatus configured to perform the method according to any of embodiments 1 to 5 and at least one second apparatus configured to perform the method according to any of embodiments 6 to 31.

In the specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program) may also be used in a corresponding manner in an example embodiment of any other category. It should also be understood that presence of a feature in the presented example embodiments shall not necessarily mean that this feature forms an essential feature of the invention and cannot be omitted or substituted.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

What is claimed:
1. An apparatus comprising at least one processor and at least one memory including computer program code, the at least one memory and the computer program code config- ured to, with the at least one processor, cause an apparatus at least to perform or control:

obtaining or causing obtaining an image of at least a part of a surface of a consignment unit;

deriving or causing deriving a representation of the at least a part of the surface from the image, the representation comprising a set of values respectively representing a corresponding set of height levels of corresponding sections of the at least a part of the surface;

generating or causing generating a string of characters based on the representation of the at least a part of the surface, the string of characters comprising at least a first portion representative of the set of height levels of the corresponding sections of the at least a part of the surface and a second portion generated based on a function of the representation and/or of the first portion of the string of characters; and associating or causing associating information representing the string of characters with shipping information of the consignment unit.

2. Apparatus according to claim 1, wherein associating the information representing the string of characters with the shipping information comprises at least one of the following:

storing or causing storing the information representing the string of characters with the shipping information of the consignment unit;

providing or causing providing the information representing the string of characters in association with the shipping information of the consignment unit to be accessible by at least one external network device.

3. Apparatus according to claim 1, wherein obtaining the image comprises obtaining or causing obtaining the image of at least a part of:

a bare surface portion of the consignment unit;

a part of a label of the consignment unit.

4. Apparatus according to claim 3, wherein obtaining the image of the at least a part of the surface comprises:

applying or causing applying ultraviolet, UV, infrared, IR, and/or white light to the at least a part of the surface.

5. The Apparatus according to claim 1, wherein the at least one external network device is a communication path.

6. An apparatus comprising at least one processor and at least one memory including computer program code, the at least one memory and the computer program code configured to, with the at least one processor, cause an apparatus at least to perform or control:

obtaining or causing obtaining first information representing a first string of characters with a first portion representative of a set of height levels of corresponding sections of at least a part of a surface of a first consignment unit;

determining or causing determining, based on the obtained first information, whether or not the first string of characters is present in a database; and if the first string of characters is present in the database, at least one of (a) or (b):

(a) outputting or causing outputting shipping information associated with the first information representing the first string of characters in the database;

(b) outputting or causing outputting a control signal based on the shipping information for causing an external apparatus to perform a predetermined operation;

wherein obtaining the first information comprises:

obtaining or causing obtaining an image of at least a part of a surface of the first consignment unit;

deriving or causing deriving a representation of the at least a part of the surface from the image, the representation comprising a set of values respectively representing a corresponding set of height levels of corresponding sections of the at least a part of the surface:

generating or causing generating the first string of characters based on the representation of the at least a part of the surface;

receiving or causing receiving the first information via a network connection.

7. Apparatus according to claim 6, wherein a second portion of the first string of characters is generated based on a function of the representation and/or of the first portion of the first string of characters.

8. Apparatus according to claim 6, wherein obtaining the image comprises obtaining or causing obtaining the image of at least a part of:

a bare surface portion of the consignment unit;

a part of a label of the consignment unit.

9. Apparatus according to claim 8, wherein obtaining the image of the at least a part of the surface comprises:

applying or causing applying ultraviolet, UV, infrared, IR, and/or white light to the at least a part of the surface.

10. An apparatus comprising at least one processor and at least one memory including computer program code, the at least one memory and the computer program code configured to, with the at least one processor, cause an apparatus at least to perform or control:

obtaining or causing obtaining first information representing a first string of characters with a first portion representative of a set of height levels of corresponding sections of at least a part of a surface of a first consignment unit;

determining or causing determining, based on the obtained first information, whether or not the first string of characters is present in a database; and if the first string of characters is present in the database, at least one of (a) or (b):

(a) outputting or causing outputting shipping information associated with the first information representing the first string of characters in the database;

(b) outputting or causing outputting a control signal based on the shipping information for causing an external apparatus to perform a predetermined operation; wherein the at least one memory and the computer program code are further configured to, with the at least one processor, cause the apparatus at least to perform or control:

if the first string of characters is not present in the database:

determining or causing determining, based on a metric function, whether or not at least one second string of characters is present in the database, a distance of which to the first string of characters is below a first predefined threshold;

if at least one second string of characters is present in the database, the distance of which to the first string of characters is below the first predefined threshold, at least one of (a), (b):

(a) outputting or causing outputting shipping information associated with information representing the at least one second string of characters in the database;

(b) outputting or causing outputting a control signal based on the shipping information associated with information representing the at least one second string of characters for causing the external apparatus to perform the predetermined operation.

11. Apparatus according to claim 10, wherein the at least one memory and the computer program code are further configured to, with the at least one processor, cause the apparatus at least to perform or control:

if at least one second string of characters is determined to be present in the database, the at least one second string of characters comprising a first portion representative of a set of height levels of corresponding sections of at least a part of a surface of at least one respective second consignment unit corresponding to the at least one second string of characters and the distance of which to the first string of characters and/or to the at least one first model string of characters is below the first and/or the second predefined threshold, the following steps (a), (b) and (c):
  (a) obtaining or causing obtaining, for each one of the at least one second string of characters, at least third information representing at least one respective second model string of characters corresponding to the at least one second string of characters with a first portion being representative of a second model set of height levels of corresponding sections of at least a part of the surface of the respective second consignment unit corresponding to the at least one second string of characters;
  (b) determining or causing determining whether or not at least one string of characters of the at least one second string of characters and the at least one corresponding second model string of characters is present in the database for which a distance to any one of the first string of characters and/or the at least one first model string of characters is below a third predefined threshold; and
  (c) if at least one string of characters of the at least one second string of characters and the at least one corresponding second model string of characters is found, the distance of which to any one of the first string of characters and/or the at least one first model string of characters is below the third predefined threshold, at least one of (c1), (c2):
  (c1) outputting or causing outputting shipping information associated with information representing the at least one string of characters of the at least one second string of characters and the at least one corresponding second model string of characters in the database;
  (c2) outputting or causing outputting a control signal based on the shipping information associated with information representing the at least one string of characters of the at least one second string of characters and the at least one corresponding second model string of characters for causing the external apparatus to perform the predetermined operation.

12. An apparatus comprising at least one processor and at least one memory including computer program code, the at least one memory and the computer program code configured to, with the at least one processor, cause an apparatus at least to perform or control:
  obtaining or causing obtaining first information representing a first string of characters with a first portion representative of a set of height levels of corresponding sections of at least a part of a surface of a first consignment unit;
  determining or causing determining, based on the obtained first information, whether or not the first string of characters is present in a database; and
  if the first string of characters is present in the database, at least one of (a) or (b):
  (a) outputting or causing outputting shipping information associated with the first information representing the first string of characters in the database;
  (b) outputting or causing outputting a control signal based on the shipping information for causing an external apparatus to perform a predetermined operation; wherein the part of the surface of the consignment unit and/or of the first consignment unit corresponds to or comprises at least in part at least one of:
  a bare surface portion of the consignment unit;
  at least a part of a label of the consignment unit.

13. An apparatus comprising at least one processor and at least one memory including computer program code, the at least one memory and the computer program code configured to, with the at least one processor, cause an apparatus at least to perform or control:
  obtaining or causing obtaining first information representing a first string of characters with a first portion representative of a set of height levels of corresponding sections of at least a part of a surface of a first consignment unit;
  determining or causing determining, based on the obtained first information, whether or not the first string of characters is present in a database; and
  if the first string of characters is present in the database, at least one of (a) or (b):
  (a) outputting or causing outputting shipping information associated with the first information representing the first string of characters in the database;
  (b) outputting or causing outputting a control signal based on the shipping information for causing an external apparatus to perform a predetermined operation; wherein the at least one memory and the computer program code are further configured to, with the at least one processor, cause the apparatus at least to perform or control:
  if the first string of characters is not present in the database, the following steps (a), (b), and (c):
  (a) obtaining or causing obtaining at least second information representing at least one first model string of characters with a first portion representative of a first model set of height levels of the corresponding sections of the at least a part of the surface of the first consignment unit;
  (b) determining or causing determining, based on a metric function, whether or not at least one second string of characters is present in the database, a distance of which to the at least one first model string of characters and/or the first string of characters is below a second predefined threshold;
  (c) if at least one second string of characters is present in the database, the distance of which to the at least one first model string of characters and/or the first string of characters is below the second predefined threshold, at least one of (c1), (c2):
  (c1) outputting or causing outputting shipping information associated with information representing the at least one second string of characters in the database;
  (c2) outputting or causing outputting a control signal based on the shipping information associated with information representing the at least one second string of characters for causing the external apparatus to perform the predetermined operation.

14. An apparatus comprising at least one processor and at least one memory including computer program code, the at least one memory and the computer program code configured to, with the at least one processor, cause an apparatus at least to perform or control:

obtaining or causing obtaining first information representing a first string of characters with a first portion representative of a set of height levels of corresponding sections of at least a part of a surface of a first consignment unit;

determining or causing determining, based on the obtained first information, whether or not the first string of characters is present in a database; and if the first string of characters is present in the database, at least one of (a) or (b):

(a) outputting or causing outputting shipping information associated with the first information representing the first string of characters in the database;

(b) outputting or causing outputting a control signal based on the shipping information for causing an external apparatus to perform a predetermined operation;

wherein for each one of the at least one first model string of characters, the first model set of height levels of the corresponding sections of the at least a part of the surface of the first consignment unit is obtained by calculating the height levels of the corresponding sections assuming different lighting conditions; and/or wherein for each one of the at least one second model string of characters, the second model set of height levels of the corresponding sections of the at least a part of the surface of the second consignment unit is obtained by calculating the height levels of the corresponding sections assuming different lighting conditions.

15. An apparatus comprising at least one processor and at least one memory including computer program code, the at least one memory and the computer program code configured to, with the at least one processor, cause an apparatus at least to perform or control:

obtaining or causing obtaining first information representing a first string of characters with a first portion representative of a set of height levels of corresponding sections of at least a part of a surface of a first consignment unit;

determining or causing determining, based on the obtained first information, whether or not the first string of characters is present in a database; and if the first string of characters is present in the database, at least one of (a) or (b):

(a) outputting or causing outputting shipping information associated with the first information representing the first string of characters in the database;

(b) outputting or causing outputting a control signal based on the shipping information for causing an external apparatus to perform a predetermined operation;

wherein the first string of characters, the at least one second string of characters, the at least one first model string of characters and the at least one second model string of characters each comprise respective second portions; and wherein respective mutual distances between the first string of characters, the at least one second string of characters, the at least one first model string of characters and the at least one second model string of characters are determined based on the metric function and based on the respective second portions.

16. An apparatus comprising at least one processor and at least one memory including computer program code, the at least one memory and the computer program code configured to, with the at least one processor, cause an apparatus at least to perform or control:

obtaining or causing obtaining first information representing a first string of characters with a first portion representative of a set of height levels of corresponding sections of at least a part of a surface of a first consignment unit;

determining or causing determining, based on the obtained first information, whether or not the first string of characters is present in a database; and if the first string of characters is present in the database, at least one of (a) or (b):

(a) outputting or causing outputting shipping information associated with the first information representing the first string of characters in the database;

(b) outputting or causing outputting a control signal based on the shipping information for causing an external apparatus to perform a predetermined operation;

wherein the string of characters, the first string of characters, the second string of characters, the at least one first model string of characters, and/or the second model string of characters further comprises a third portion different from the first and/or the second portion and being determined based on a hash function of the first portion and/or the second portion and/or comprising a checksum of the first portion and/or the second portion.

17. A method performed by at least one apparatus, the method comprising:

obtaining or causing obtaining first information representing a first string of characters with a first portion representative of a set of height levels of corresponding sections of at least a part of a surface of a first consignment unit;

determining or causing determining, based on the obtained first information, whether or not the first string of characters is present in a database; and if the first string of characters is present in the database, the method further comprises at least one of (a) or (b):

(a) outputting or causing outputting shipping information associated with the first information representing the first string of characters in the database;

(b) outputting or causing outputting a control signal based on the shipping information for causing an external apparatus to perform a predetermined operation;

wherein obtaining the first information comprises:

obtaining or causing obtaining an image of at least a part of a surface of the first consignment unit;

deriving or causing deriving a representation of the at least a part of the surface from the image, the representation comprising a set of values respectively representing a corresponding set of height levels of corresponding sections of the at least a part of the surface:

generating or causing generating the first string of characters based on the representation of the at least a part of the surface;

or receiving or causing receiving the first information via a network connection.

18. The method according to claim 17, wherein the part of the surface of the consignment unit and/or of the first consignment unit corresponds to or comprises at least in part at least one of:

a bare surface portion of the consignment unit;

at least a part of a label of the consignment unit.

19. The method according to claim 17, further comprising:

if the first string of characters is not present in the database, the method further comprises the following steps (a), (b), and (c):
(a) obtaining or causing obtaining at least second information representing at least one first model string of characters with a first portion representative of a first model set of height levels of the corresponding sections of the at least a part of the surface of the first consignment unit;
(b) determining or causing determining, based on a metric function, whether or not at least one second string of characters is present in the database, a distance of which to the at least one first model string of characters and/or the first string of characters is below a second predefined threshold;
(c) if at least one second string of characters is present in the database, the distance of which to the at least one first model string of characters and/or the first string of characters is below the second predefined threshold, the method further comprises at least one of (c1), (c2):
(c1) outputting or causing outputting shipping information associated with information representing the at least one second string of characters in the database;
(c2) outputting or causing outputting a control signal based on the shipping information associated with information representing the at least one second string of characters for causing the external apparatus to perform the predetermined operation.

20. A method performed by at least one apparatus, the method comprising:
obtaining or causing obtaining first information representing a first string of characters with a first portion representative of a set of height levels of corresponding sections of at least a part of a surface of a first consignment unit;
determining or causing determining, based on the obtained first information, whether or not the first string of characters is present in a database; and
if the first string of characters is present in the database, the method further comprises at least one of (a) or (b):
(a) outputting or causing outputting shipping information associated with the first information representing the first string of characters in the database;
(b) outputting or causing outputting a control signal based on the shipping information for causing an external apparatus to perform a predetermined operation; further comprising:
if the first string of characters is not present in the database:
determining or causing determining, based on a metric function, whether or not at least one second string of characters is present in the database, a distance of which to the first string of characters is below a first predefined threshold;
if at least one second string of characters is present in the database, the distance of which to the first string of characters is below the first predefined threshold, the method further comprises at least one of (a), (b):
(a) outputting or causing outputting shipping information associated with information representing the at least one second string of characters in the database;
(b) outputting or causing outputting a control signal based on the shipping information associated with information representing the at least one second string of characters for causing the external apparatus to perform the predetermined operation.

21. A method performed by at least one apparatus, the method comprising:
obtaining or causing obtaining first information representing a first string of characters with a first portion representative of a set of height levels of corresponding sections of at least a part of a surface of a first consignment unit;
determining or causing determining, based on the obtained first information, whether or not the first string of characters is present in a database; and
if the first string of characters is present in the database, the method further comprises at least one of (a) or (b):
(a) outputting or causing outputting shipping information associated with the first information representing the first string of characters in the database;
(b) outputting or causing outputting a control signal based on the shipping information for causing an external apparatus to perform a predetermined operation; further comprising:
if at least one second string of characters is determined to be present in the database, the at least one second string of characters comprising a first portion representative of a set of height levels of corresponding sections of at least a part of a surface of at least one respective second consignment unit corresponding to the at least one second string of characters and the distance of which to the first string of characters and/or to the at least one first model string of characters is below the first and/or the second predefined threshold, the method further comprises the following steps (a), (b) and (c):
(a) obtaining or causing obtaining, for each one of the at least one second string of characters, at least third information representing at least one respective second model string of characters corresponding to the at least one second string of characters with a first portion being representative of a second model set of height levels of corresponding sections of at least a part of the surface of the respective second consignment unit corresponding to the at least one second string of characters;
(b) determining or causing determining whether or not at least one string of characters of the at least one second string of characters and the at least one corresponding second model string of characters is present in the database for which a distance to any one of the first string of characters and/or the at least one first model string of characters is below a third predefined threshold; and
(c) if at least one string of characters of the at least one second string of characters and the at least one corresponding second model string of characters is found, the distance of which to any one of the first string of characters and/or the at least one first model string of characters is below the third predefined threshold, the method further comprises at least one of (c1), (c2):
(c1) outputting or causing outputting shipping information associated with information representing the at least one string of characters of the at least one second string of characters and the at least one corresponding second model string of characters in the database;
(c2) outputting or causing outputting a control signal based on the shipping information associated with information representing the at least one string of characters of the at least one second string of characters and the at least one corresponding second model string of characters for causing the external apparatus to perform the predetermined operation.

22. A non-transitory computer readable storage medium in which a computer program is stored, the computer program when executed by a processor causing an apparatus or system to perform or control:

obtaining or causing obtaining first information representing a first string of characters with a first portion representative of a set of height levels of corresponding sections of at least a part of a surface of a first consignment unit;

determining or causing determining, based on the obtained first information, whether or not the first string of characters is present in a database; and if the first string of characters is present in the database, at least one of (a) or (b):

(a) outputting or causing outputting shipping information associated with the first information representing the first string of characters in the database;

(b) outputting or causing outputting a control signal based on the shipping information for causing an external apparatus to perform a predetermined operation;

wherein obtaining the first information comprises:

obtaining or causing obtaining an image of at least a part of a surface of the first consignment unit;

deriving or causing deriving a representation of the at least a part of the surface from the image, the representation comprising a set of values respectively representing a corresponding set of height levels of corresponding sections of the at least a part of the surface;

generating or causing generating the first string of characters based on the representation of the at least a part of the surface;

or receiving or causing receiving the first information via a network connection.

23. A method performed by at least one apparatus, the method comprising:

obtaining or causing obtaining an image of at least a part of a surface of a consignment unit;

deriving or causing deriving a representation of the at least a part of the surface from the image, the representation comprising a set of values respectively representing a corresponding set of height levels of corresponding sections of the at least a part of the surface;

generating or causing generating a string of characters based on the representation of the at least a part of the surface, the string of characters comprising at least a first portion representative of the set of height levels of the corresponding sections of the at least a part of the surface and a second portion generated based on a function of the representation and/or of the first portion of the string of characters; and associating or causing associating information representing the string of characters with shipping information of the consignment unit.

24. A non-transitory computer readable storage medium in which a computer program is stored, the computer program when executed by a processor causing an apparatus or system to perform or control:

obtaining or causing obtaining an image of at least a part of a surface of a consignment unit;

deriving or causing deriving a representation of the at least a part of the surface from the image, the representation comprising a set of values respectively representing a corresponding set of height levels of corresponding sections of the at least a part of the surface;

generating or causing generating a string of characters based on the representation of the at least a part of the surface, the string of characters comprising at least a first portion representative of the set of height levels of the corresponding sections of the at least a part of the surface and a second portion generated based on a function of the representation and/or of the first portion of the string of characters; and associating or causing associating information representing the string of characters with shipping information of the consignment unit.

\* \* \* \* \*

UNITED STATES PATENT AND TRADEMARK OFFICE
CERTIFICATE OF CORRECTION

PATENT NO. : 11,907,890 B2
APPLICATION NO. : 17/235585
DATED : February 20, 2024
INVENTOR(S) : Ali Özyigit et al.

It is certified that error appears in the above-identified patent and that said Letters Patent is hereby corrected as shown below:

In the Claims

Claim 6, Line 29 reads:
"responding sections of the at least a part of the surface:"
Should read:
--responding sections of the at least a part of the surface;--

Claim 6, Line 32 reads:
"of the surface;"
Should read:
--of the surface; or--

Claim 17, Line 26 reads:
"responding sections of the at least a part of the surface:"
Should read:
--responding sections of the at least a part of the surface;--

Signed and Sealed this
Ninth Day of April, 2024

Katherine Kelly Vidal
*Director of the United States Patent and Trademark Office*